United States Patent
Eger et al.

(10) Patent No.: US 11,424,897 B2
(45) Date of Patent: Aug. 23, 2022

(54) PEAK SUPPRESSION INFORMATION MULTIPLEXING ON UPLINK SHARED CHANNEL

(71) Applicant: QUALCOMM Incorporated, San Diego, CA (US)

(72) Inventors: Ory Eger, Tel Aviv (IL); Assaf Touboul, Netanya (IL); Noam Zach, Kiryat Ono (IL); Sharon Levy, Binyamina (IL); Guy Wolf, Rosh Haayin (IL); Shay Landis, Hod Hasharon (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/031,006

(22) Filed: Sep. 24, 2020

(65) Prior Publication Data

US 2021/0328751 A1    Oct. 21, 2021

Related U.S. Application Data

(60) Provisional application No. 63/010,432, filed on Apr. 15, 2020.

(51) Int. Cl.
*H04L 5/26* (2006.01)
*H04L 5/02* (2006.01)
(Continued)

(52) U.S. Cl.
CPC ............ *H04L 5/023* (2013.01); *H04L 5/0007* (2013.01); *H04L 5/0053* (2013.01); *H04L 27/2624* (2013.01); *H04L 27/2628* (2013.01)

(58) Field of Classification Search
CPC ..... H04L 5/023; H04L 5/0007; H04L 5/0053; H04L 27/2624; H04L 27/2628; H04L 27/2614; H04L 27/2623; H04L 27/2647
See application file for complete search history.

(56) References Cited

U.S. PATENT DOCUMENTS 8,009,756 B2 * 8/2011 Ishikawa ............. H04L 27/2624
                                                            375/285
8,582,671 B2 * 11/2013 Yokoyama .......... H04L 27/2614
                                                            375/295
(Continued)

FOREIGN PATENT DOCUMENTS

EP         2141874 A1      1/2010
JP       2001274768 A     10/2001
(Continued)

OTHER PUBLICATIONS

International Search Report and Written Opinion—PCT/US2021/026897—ISA/EPO—dated Jun. 25, 2021.

*Primary Examiner* — Jay P Patel
(74) *Attorney, Agent, or Firm* — Holland & Hart LLP; Kevin M. Donnelly

(57) ABSTRACT

A user equipment (UE) may multiplex peak suppression information message (PSIM) on a physical uplink shared channel (PUSCH) with data for efficient implementation of PSIMs for peak to average power ratio (PAPR) reduction. A UE may clip peaks from a signal to be transmitted and capture information of the clipped peaks into a PSIM. The UE may then multiplex the PSIM on the PUSCH such that a receiving device (for example, a base station) may receive the signal and reconstruct the signal (for example, PUSCH data) using the PSIM. According to some aspects, each PUSCH symbol may include a PSIM for a previous PUSCH symbol (for example, such that causality is preserved if multiplexing PSIM and data for each PUSCH symbol).

(Continued)

Various aspects of the techniques described herein may further provide for PSIM positioning in frequency, PSIM modulation, PSIM channel coding, PSIM multiple-input multiple-output (MIMO) configurations, among other examples.

62 Claims, 20 Drawing Sheets

(51) Int. Cl.
  *H04L 5/00* (2006.01)
  *H04L 27/26* (2006.01)

(56) References Cited

U.S. PATENT DOCUMENTS

| | | | | |
|---|---|---|---|---|
| 2004/0090283 | A1* | 5/2004 | Naito | H04L 27/2624 333/17.2 |
| 2008/0267312 | A1* | 10/2008 | Yokoyama | H04L 5/0044 375/267 |
| 2010/0316162 | A1* | 12/2010 | Higuchi | H04L 27/2623 375/295 |
| 2012/0147802 | A1* | 6/2012 | Ukita | H04W 52/0258 370/311 |
| 2016/0007341 | A1* | 1/2016 | Nogami | H04L 1/1812 370/329 |
| 2016/0028520 | A1* | 1/2016 | Nogami | H04W 72/042 370/329 |
| 2019/0260498 | A1* | 8/2019 | Moroga | H04L 1/0003 |
| 2020/0076661 | A1* | 3/2020 | Ishikawa | H04L 27/2626 |
| 2021/0328752 | A1* | 10/2021 | Eger | H04L 27/2624 |

FOREIGN PATENT DOCUMENTS

| | | | | |
|---|---|---|---|---|
| JP | 2018064222 A | * | 4/2018 | |
| WO | WO-2007088583 A1 | * | 8/2007 | ......... H04L 27/2614 |
| WO | WO-2016143309 A1 | * | 9/2016 | ............... H04B 1/04 |
| WO | WO-2017165650 A1 | | 9/2017 | |

* cited by examiner

PEAK SUPPRESSION INFORMATION MULTIPLEXING ON UPLINK SHARED CHANNEL

CROSS REFERENCE

The present Application for Patent claims the benefit of U.S. Provisional Patent Application No. 63/010,432 by Eger et al., entitled "PEAK SUPPRESSION INFORMATION MULTIPLEXING ON UPLINK SHARED CHANNEL," filed Apr. 15, 2020, assigned to the assignee hereof, and expressly incorporated by reference in its entirety herein.

TECHNICAL FIELD

The following relates generally to wireless communications and more specifically to generating peak suppression information associated with reducing amplitudes of a data signal and multiplexing the peak suppression information with other data in an uplink shared channel.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A signal transmitted by a base station to a UE may have an associated peak to average power ratio (PAPR). As PAPR increases, the efficiency of a power amplifier (PA) amplifying the signal (for example, a ratio of an output power to an input power for the PA) may decrease. The base stations with PAs having a decreased efficiency may consume more power or have other performance drawbacks.

SUMMARY

Various aspects relate generally to multiplexing peak suppression information on an uplink shared channel. Generally, the described techniques enable efficient peak to average power ratio (PAPR) reduction via multiplexing a peak suppression information message (PSIM) with data on a physical uplink shared channel (PUSCH), or on other uplink data or uplink shared (data and control) channels. In some aspects, a user equipment (UE) may clip peaks or otherwise reduce the amplitudes of data samples of an uplink data signal to be transmitted via symbols of a PUSCH to reduce the PAPR of the uplink transmission. For example, a UE may perform an inverse fast Fourier transform (IFFT) on a modulated symbol of an uplink data message to transform the uplink data message in the frequency domain to a time-domain data signal. In the time domain, the UE may then clip, chop off, or otherwise reduce the amplitude peaks of the data signal that exceed a clipping threshold or an amplitude peak threshold (for example, the UE may clip amplitudes of samples of the data signal that are significantly higher than an average power of the data signal). The UE may generate a PSIM based on the clipping that includes amplitude information, position information, or phase information associated with the clipped amplitude peaks of the data signal. A base station receiving the PUSCH, including the symbols containing the data of the clipped data signal as well as the PSIM, may reconstruct the uplink data message based on the received data and the peak suppression information.

In some examples, the UE may multiplex the PSIM with the other unclipped data in the same PUSCH symbol. In some other examples, the UE may multiplex the PSIM with other data in a subsequent symbol of the PUSCH. For instance, in some such examples, each PUSCH symbol may include data in addition to a PSIM for a previous PUSCH symbol. For example, a data signal segment in the time domain for a symbol N may include a data message for the symbol N as well as a PSIM for the data signal segment corresponding to the previous symbol N−1. In this manner, causality is preserved if multiplexing the PSIM and data for each PUSCH symbol. As used herein, a data signal segment may refer to a portion or segment of a PUSCH signal corresponding to a symbol (for example, a data signal segment may refer to a time-domain data signal over the duration of a symbol period resulting from a modulated symbol of an uplink data message on the PUSCH).

Various aspects also relate to configurations for multiplexing peak suppression information on an uplink shared channel. For example, a base station may configure time and frequency resources for multiplexing a PSIM, such as by indicating patterns of resource elements (REs) for carrying the peak suppression information. The base station also may configure various other parameters for multiplexing the peak suppression information such as, for example, uplink PSIM modulation, uplink PSIM channel coding, and uplink PSIM multiple-input multiple-output (MIMO) configurations, among other examples. In some examples, the base station may configure the UE for peak suppression information multiplexing on a PUSCH via a physical downlink control channel (PDCCH). In some implementations, the configuration for multiplexing the peak suppression information on the PUSCH may be based on a configured priority ($\beta$) of the uplink PSIM.

One innovative aspect of the subject matter described in this disclosure can be implemented in a method for wireless communication. The method includes determining a configuration for frequency multiplexing a peak suppression information on an uplink shared channel, deconstructing an uplink data message into a data signal and the peak suppression information, frequency multiplexing the data signal with the peak suppression information based on the determined configuration, and transmitting, on the uplink shared channel in the first slot according to the determined configuration, the peak suppression information frequency multiplexed with the data signal in a first slot.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to determine a configuration for frequency multiplexing a peak suppression information on an uplink shared channel, deconstruct an uplink data message into a data signal and the peak suppression information, frequency multiplexing the data signal with the peak suppression information based on the determined configuration, and transmit, on the uplink shared channel in a first slot according to the determined configuration, the peak suppression information frequency multiplexed with the data signal in a first slot.

Another innovative aspect of the subject matter described in this disclosure can be implemented in an apparatus for wireless communications at a UE. The apparatus may include means for determining a configuration for frequency multiplexing a peak suppression information on an uplink shared channel, deconstructing an uplink data message into a data signal and the peak suppression information, frequency multiplexing the data signal with the peak suppression information based on the determined configuration, and transmitting, on the uplink shared channel in a first slot according to the determined configuration, the peak suppression information frequency multiplexed with the data signal in a first slot.

Another innovative aspect of the subject matter described in this disclosure can be implemented in a non-transitory computer-readable medium storing code for wireless communications at a UE. The code may include instructions executable by a processor to determine a configuration for frequency multiplexing a peak suppression information on an uplink shared channel, deconstruct an uplink data message into a data signal and the peak suppression information, frequency multiplexing the data signal with the peak suppression information based on the determined configuration, and transmit, on the uplink shared channel in a first slot according to the determined configuration, the peak suppression information frequency multiplexed with the data signal in a first slot.

Some examples of the method, apparatuses, and non-transitory computer-readable medium described herein may further include operations, features, means, or instructions for receiving an indication of a priority associated with the peak suppression information, in which the configuration may be based on the priority. Some examples of the method, apparatuses, and non-transitory computer-readable medium described herein may further include operations, features, means, or instructions for receiving configuration information including an indication of a pattern of resource elements for the peak suppression information, the configuration determined based on the received configuration information.

In some examples of the method, apparatuses, and non-transitory computer-readable medium described herein, deconstructing the uplink data message may include operations, features, means, or instructions for determining a subset of amplitude peaks of the data signal to be included in the peak suppression information based on the pattern of resource elements. In some examples of the method, apparatuses, and non-transitory computer-readable medium described herein, the frequency multiplexing further may include operations, features, means, or instructions for frequency multiplexing the data signal and the peak suppression information with one or more of a channel state information or an acknowledgement feedback message.

One innovative aspect of the subject matter described in this disclosure can be implemented in a method for wireless communications at a base station. The method includes determining a configuration for frequency multiplexing peak suppression information on an uplink shared channel, receiving, on the uplink shared channel based on the determined configuration, the peak suppression information frequency multiplexed with a data signal in a first slot, reconstructing an uplink data message based on the received data signal and the received peak suppression information, and decoding the reconstructed uplink data message.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to determine a configuration for frequency multiplexing peak suppression information on an uplink shared channel, receive, on the uplink shared channel based on the determined configuration, the peak suppression information frequency multiplexed with a data signal in a first slot, reconstruct an uplink data message based on the received data signal and the received peak suppression information, and decode the reconstructed uplink data message.

Another innovative aspect of the subject matter described in this disclosure can be implemented in an apparatus for wireless communications at a base station. The apparatus may include means for determining a configuration for frequency multiplexing peak suppression information on an uplink shared channel, receiving, on the uplink shared channel based on the determined configuration, the peak suppression information frequency multiplexed with a data signal in a first slot, reconstructing an uplink data message based on the received data signal and the received peak suppression information, and decoding the reconstructed uplink data message.

Another innovative aspect of the subject matter described in this disclosure can be implemented in a non-transitory computer-readable medium storing code for wireless communications at a base station. The code may include instructions executable by a processor to determine a configuration for frequency multiplexing peak suppression information on an uplink shared channel, receive, on the uplink shared channel based on the determined configuration, the peak suppression information frequency multiplexed with a data signal in a first slot, reconstruct an uplink data message based on the received data signal and the received peak suppression information, and decode the reconstructed uplink data message.

Some examples of the method, apparatuses, and non-transitory computer-readable medium described herein may further include operations, features, means, or instructions for transmitting an indication of a priority associated with the peak suppression information, in which the configuration may be based on the priority. Some examples of the method, apparatuses, and non-transitory computer-readable medium described herein may further include operations, features, means, or instructions for transmitting configuration information including an indication of a pattern of resource elements for the peak suppression information, the configuration determined based on the transmitted configuration information.

In some examples of the method, apparatuses, and non-transitory computer-readable medium described herein, reconstructing the uplink data message may include operations, features, means, or instructions for determining a subset of amplitude peaks of the data signal included in the peak suppression information based on the indicated pattern of resource elements. Some examples of the method, apparatuses, and non-transitory computer-readable medium described herein may further include operations, features, means, or instructions for receiving the data signal and the peak suppression information multiplexed in frequency with one or more of a channel state information or an acknowledgement feedback message. In some examples of the method, apparatuses, and non-transitory computer-readable medium described herein, reconstructing the uplink data message may include operations, features, means, or instructions for reconstructing the uplink data message based on the data signal received in a first symbol period of the uplink shared channel and the peak suppression information received in a second symbol period of the uplink shared channel, the second symbol period after the first symbol period.

In some examples of the method, apparatuses, and non-transitory computer-readable medium described herein, reconstructing the uplink data message may include operations, features, means, or instructions for reconstructing the uplink data message based on the peak suppression information received in a first symbol period of the uplink shared channel and the data signal received in a second symbol period of the uplink shared channel, the second symbol period after the first symbol period. In some examples of the method, apparatuses, and non-transitory computer-readable medium described herein, reconstructing the uplink data message may include operations, features, means, or instructions for reconstructing the uplink data message based on the data signal received in a same symbol period of the uplink shared channel as the peak suppression information.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
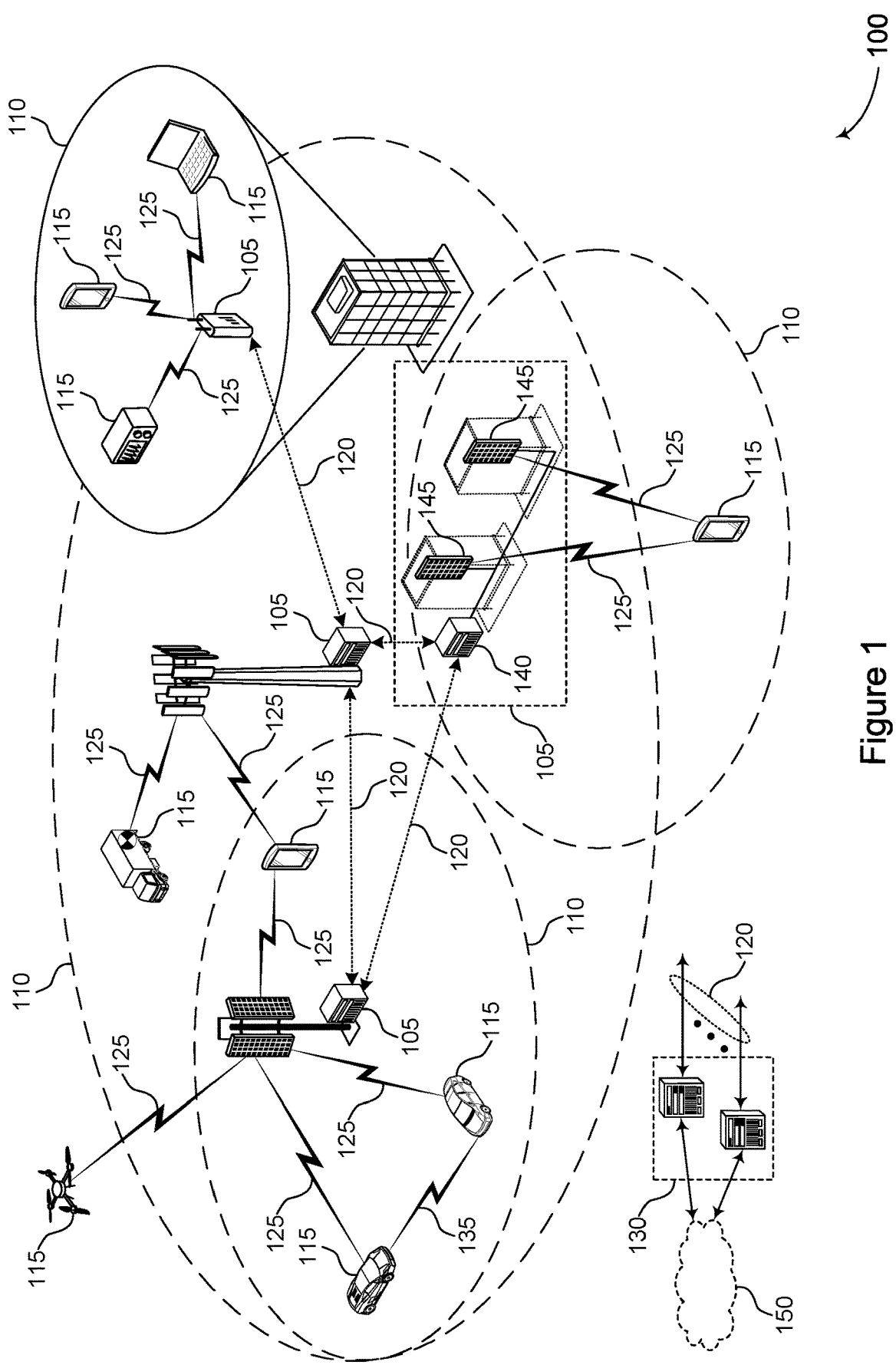
FIG. 1 illustrates an example of a wireless communications system that supports peak suppression information message (PSIM) multiplexing on a physical uplink shared channel (PUSCH) in accordance with one or more aspects of the present disclosure.

Some wireless communications systems (for example, 5G NR systems) may support higher-order constellations (such as 256 quadrature amplitude modulation (QAM), 1024 QAM, 4K QAM, or 16K QAM, among other examples) which may require low error vector magnitude (EVM) to ensure accurate data recovery. EVM may refer to a measure of the distance between the points on a constellation and their ideal locations. As each constellation point may represent a different phase and amplitude combination, higher-order constellations thus may require a power amplifier (PA) of a transmitter to have an operating range large enough to represent the range of amplitudes in a data signal to be transmitted (for example, in order to ensure low EVM). However, OFDMA signaling techniques may yield high peak-to-average power ratios (PAPRs) compared to single-carrier signaling techniques, which may significantly increase power consumption of the PA at the transmitter or reduce the efficiency of the PA at the transmitter, among other examples.

Various aspects relate generally to multiplexing peak suppression information on an uplink shared channel. Some particular aspects enable PAPR reduction while maintaining network efficiency and avoiding increasing latency. In some examples, a user equipment (UE) is configured to multiplex a peak suppression information message (PSIM) with data on a physical uplink shared channel (PUSCH). In some aspects, to reduce PAPR, the UE may clip peaks corresponding to data samples of a time-domain data signal to reduce the amplitudes associated with the respective data samples such that they are below a clipping threshold or peak amplitude threshold. For example, the UE may perform an inverse fast Fourier transform (IFFT) on a frequency domain representation of a data message to obtain a time-domain data signal that includes data samples representing the data message in the time domain. The UE may then clip or remove peaks of the time-domain data signal by reducing the amplitudes of the respective data samples to below the clipping threshold or peak amplitude threshold. In some examples, the UE may subtract a portion of the amplitude of a peak to reduce the amplitude to below the clipping threshold. In some examples, the UE may remove a peak amplitude entirely and replace the amplitude of the data sample with another amplitude, which may have a determined value that is below the clipping threshold.

Along with clipping the peaks, the UE also generates peak suppression information associated with the clipped peaks and transmits a PSIM that includes the peak suppression information to the base station. The peak suppression information may include amplitude information as well as position information and phase information associated with the clipped amplitude peaks of the transmitted data signal. The peak suppression information enables the base station to reconstruct the original time-domain data signal from the clipped version, and ultimately reconstruct the uplink data message.

In some examples, the UE may multiplex the PSIM with the other unclipped data in the same PUSCH symbol. In some other examples, the UE may multiplex the PSIM with other data in a subsequent symbol of the PUSCH. More specifically, in such latter examples, each PUSCH symbol may include data in addition to a PSIM for a previous PUSCH symbol. For example, a data signal segment in the time domain for a symbol N may include a data message for the symbol N as well as a PSIM for the data signal segment corresponding to the previous symbol N−1. In this manner, causality is preserved if multiplexing the PSIM and data for each PUSCH symbol. As used herein, a data signal segment may refer to a portion or segment of a PUSCH signal corresponding to a symbol (for example, a data signal segment may refer to a time-domain data signal, over the duration of a symbol period, resulting from a modulated symbol of an uplink data message on the PUSCH).

Various aspects also relate to configurations for multiplexing peak suppression information on an uplink shared channel. For example, a base station may configure time and frequency resources for multiplexing a PSIM, such as by indicating patterns of resource elements (REs) for carrying the peak suppression information. The base station also may configure various other parameters for multiplexing the peak suppression information such as, for example, uplink PSIM modulation, uplink PSIM channel coding, and uplink PSIM multiple-input multiple-output (MIMO) configurations, among other examples. In some examples, the base station may configure the UE for peak suppression information multiplexing on a PUSCH via signaling on a physical downlink control channel (PDCCH).

In some implementations, the configuration for multiplexing peak suppression information on a PUSCH may be based at least in part on a priority ($\beta$) of the uplink PSIM. The uplink PSIM may be configured to use the same PUSCH resources as uplink data and other uplink control information (UCI). As such, the base station may control the priority ($\beta$) of the uplink PSIM (ULPSIM) (for example, by configuring $\beta_{offset}^{ULPSIM}$) in order to control UE arrangement of PUSCH REs for PSIMs and other UCI. For instance, the configuration for frequency multiplexing peak suppression information on the PUSCH may be based on $\beta_{offset}^{ULPSIM}$ in addition to, or relative to $\beta$ of other UCI associated with PUSCH multiplexing (for example, such as channel state information reference signal (CSI-RS), hybrid automatic repeat request (HARQ) feedback, among other examples).

Various aspects generally relate to generating peak suppression information and multiplexing the peak suppression information with other data, and more specifically, to peak suppression information associated with reducing amplitudes of a data signal. In some aspects, a UE may clip peaks or otherwise reduce the amplitudes of data samples of an uplink data signal to reduce the PAPR of the uplink transmission. The UE may generate a PSIM based on the clipping that includes amplitude information, position information, or phase information associated with the clipped amplitude peaks of the data signal. A base station receiving the PUSCH, including the symbols containing the data of the clipped data signal as well as the PSIM, may reconstruct the uplink data message based on the received data and the peak suppression information. In some examples, the UE may multiplex the PSIM with the other unclipped data in the same PUSCH symbol or with other data in a subsequent symbol of the PUSCH.

Particular aspects of the subject matter described in this disclosure may be implemented to realize one or more of the following potential advantages. The techniques employed by the described communication devices may provide benefits and enhancements to the operation of the communication devices. In accordance with these techniques, the UEs may more efficiently employ OFDMA and higher-order constellations for uplink communications with a base station. In some aspects, by reducing the PAPR associated with transmitting an uplink data message, and by multiplexing peak suppression information with other data, the UE may efficiently reduce EVMs and reduce power consumption (for example, and thus increase battery life) for uplink communications.

Aspects of the disclosure are initially described in the context of example wireless communications systems. Example data signal processing chains, example signals and example clipped signals, an example multiplexing configuration, and an example process flow each illustrating one or more aspects of the discussed techniques are then described. Aspects of the disclosure are further illustrated by and described with reference to apparatus diagrams, system diagrams, and flowcharts that relate to PSIM multiplexing on the PUSCH.

FIG. 1 illustrates an example of a wireless communications system 100 that supports PSIM multiplexing on a PUSCH in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with reference to FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown with reference to FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown with reference to FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a wireless local area network (WLAN), such as a Wi-Fi (in other words, Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (for example, the communication link from the AP to the device) and uplink (for example, the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Performing OFDMA may have several advantages. For instance, OFDMA may simplify channel estimation at a receiver (for example, at a base station 105 receiving a data signal from a UE 115). Further, OFDMA may enable additional flexibility in utilizing available time and frequency resources (for example, as compared to single carrier techniques), among other benefits. However, performing OFDMA may also increase data signal PAPR (for example, as compared to single carrier techniques). As the PAPR increases, the power efficiency $\mu=P_{out}/P_{in}$ of a PA may exhibit increasingly non-linear behavior at a lower $P_{in}$ ($P_{out}$ may increase less for a proportional increase in $P_{in}$). For example, for a lower PAPR, the power efficiency may be approximately linear from $P_{in}=0$ to $P_{in}=P_x$ (in which $P_x$ may be referred to as a working point for the lower PAPR). Similarly, for a higher PAPR, the power efficiency may be approximately linear from $P_{in}=0$ to $P_{in}=P_y$ (in which $P_y$ may be referred to as a working point for the higher PAPR), in which $P_x>P_y$. To enhance (for example, maximize) the power efficiency, a PA may be operated with the working point near the non-linear part of the power efficiency curve. Additionally, the rate of change of $P_{out}$ at $P_x$ for the lower PAPR may be higher than the rate of change of $P_{out}$ at $P_x$ for the higher PAPR. The back-off (BO) of $P_y$ (for example, a difference between a saturation power and a $P_{out}$ at $P_y$) may be larger than the BO of $P_x$ (for example, a difference between the saturation power and a $P_{out}$ at $P_x$).

That is, as $P_{out}$ is a function of $P_{in}$, an optimal PA working point may be as close as possible to the nonlinear part of the curve. Hence, in cases of high PAPR a large BO may be implemented in order to have efficient EVM desirable for higher-order constellations. In other words, if PAPR is high, a PA may implement a large BO (for example, from a power saturation level ($P_{sat}$) to the average power of the signal) from the point in which the curve becomes non-linear. Reducing PAPR may utilize less BO and enable a working point with a higher power efficiency (for example, an average signal power or working point closer to the nonlinear part of the $\mu=P_{out}/P_{in}$ curve). Thus, with lower PAPR, power consumption may be reduced without compromising EVM. A PA may thus be more efficient under low PAPR as the working point may be closer to the power saturation level ($P_{sat}$) without compromising less efficient power consumption via additional $P_{in}$ (for example, without the working point passing the non-linear point of the curve). By reducing the PAPR, the PA may operate more efficiently as the PA may achieve higher $P_{out}$ for the same $P_{in}$, and as a result, reduce power consumption of the receiving device.

As the size of, or a number of points in a signal constellation increases (for example, 256 QAM to 1024 QAM to 4 KQAM to 16 KQAM and so on), a transmitter (for example, a UE 115) may use more power to achieve sufficiently low EVM, which may result in higher power consumption, reduced battery life, increased energy cost, among other examples. For example, for higher-order constellations (for example, 16 KQAM) it may be desirable to realize low bit error rates (BERs) to recover information from a data signal (for example, as higher-order constellation points may be represented by more granular differences in phase and amplitude combinations). However, if the transmitter is transmitting a data signal with a higher PAPR at a high $P_{in}$ (for example, to reduce EVM), the power efficiency µ of the PA amplifying the signal may be lower than that for transmitting a data signal with a lower PAPR at the same $P_{in}$. As such, methods which reduce the PAPR may enable more efficient power consumption (for example, enable a working point with higher power efficiency) while achieving sufficiently low EVM for maintaining constellations of increasing size (for example, increasing order).

Wireless communications system 100 may support techniques for reducing PAPR. For example, for uplink communications, the UEs 115 may reduce PAPR by clipping or chopping off peaks from a data signal (for example, in which each peak of a data signal that is above a clipping threshold may be clipped or chopped off). For example, during data signal processing for uplink communications, a UE 115 may perform an IFFT and clip or remove peaks of the data signal (for example, represented across the time domain after the IFFT) based on some clipping level or peak amplitude threshold. In some implementations, the UE 115 may then fill in the peaks with pre-determined values below the clipping threshold. Additionally, the UE 115 may generate and ultimately transmit a PSIM that includes information about the chopped peaks, which may enable a receiving device (for example, a base station 105) that receives the clipped data signal to at least partially reconstruct the original data signal (for example, the data signal prior to being clipped) based on information of the PSIM.

According to the techniques described herein, a UE 115 may multiplex PSIMs on a PUSCH with data for efficient implementation of PSIMs for PAPR reduction. A UE 115 may clip peaks from a data signal (for example, peaks from a IFFT of a modulated PUSCH symbol) and capture information of the clipped peaks into a PSIM. The UE 115 may then multiplex the PSIM on the PUSCH such that a receiving device (for example, a base station 105) may receive the data signal and reconstruct the PUSCH using the PSIM. According to some aspects, each PUSCH symbol may include a PSIM for a previous PUSCH symbol (for example, such that causality is preserved when multiplexing PSIM and data for each PUSCH symbol). Various aspects of the techniques described herein may further provide for PSIM positioning in frequency, PSIM modulation, PSIM channel coding, PSIM MIMO configurations, among other examples. In accordance with these techniques, the UEs 115 may more efficiently employ OFDMA and higher-order constellations. For instance, the UEs 115 may achieve increased EVM performance and efficient power consumption for uplink communications via improved PAPR resulting from PSIM multiplexing on the PUSCH.

In some examples, the UEs 115 may transmit capability information to a base station 105. The capability information may include an indication of peak reconstruction capability, which may indicate whether or not the UE 115 supports data signal clipping (for example, in which data signal segments correspond to each symbol of a PUSCH), implementation of PSIMs, or both (for example, a UE 115 may support or be able to support data signal clipping, but, in some implementations, may not support generation and multiplexing of PSIMs). In some implementations, a UE 115 may receive, from the base station 105 based on the capability information, control signaling indicating configuration information (for example, an RE pattern) indicating a multiplexing configuration for the PSIM (for example, a configuration for frequency multiplexing of the PSIM on the PUSCH). The UE 115 may perform data signal PUSCH clipping for PAPR reduction, PSIM generation, and peak suppression information multiplexing in accordance with the control signaling. Upon receiving the clipped PUSCH data signal (for example, upon receiving a clipped data signal segment corresponding to a PUSCH symbol), a base station 105 may reconstruct the uplink data messages based on the conveyed multiplexing configuration (for example, based on an indicated clipping level, based on PSIMs received according to an indicated pattern of REs for the PSIMs, among other examples).

Figure 2:
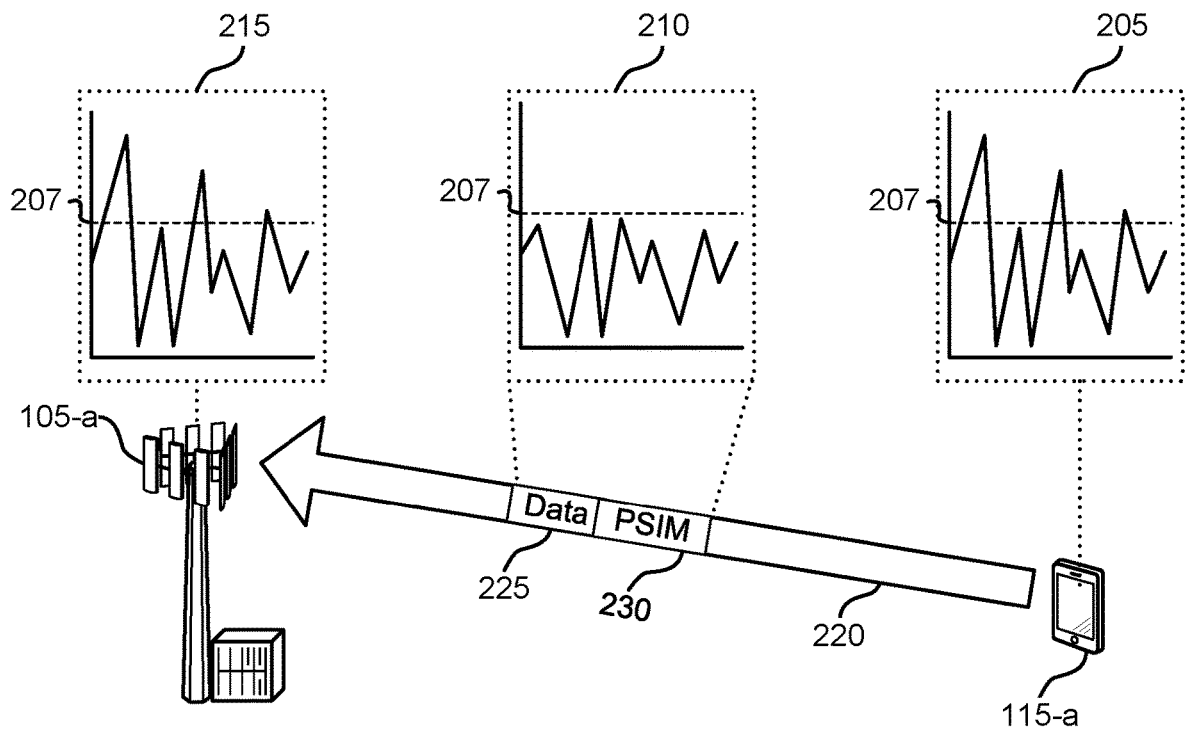
FIG. 2 illustrates an example of a wireless communications system that supports PSIM multiplexing on a PUSCH in accordance with one or more aspects of the present disclosure.

FIG. 2 illustrates an example of a wireless communications system 200 that supports PSIM multiplexing on a PUSCH in accordance with one or more aspects of the present disclosure. In some examples, wireless communications system 200 may implement aspects of wireless communications system 100. For example, wireless communications system 200 may include a base station 105-a and a UE 115-a, which may be examples of a base station 105 or a UE 115 as described with reference to FIG. 1. Wireless communications system 200 may illustrate an example of uplink communications 220 from the UE 115-a to the base station 105-a. As discussed herein, the UE 115-a may multiplex a data message 225 and a PSIM 230 (for example, on a PUSCH).

For instance, the UE 115-a may generate a data signal segment 205 with multiple peaks (for example, amplitude peaks) above clipping threshold 207 (for example, above an amplitude peak threshold). To lower a PAPR of the data signal segment 205 for a symbol (for example, a PUSCH symbol), the UE 115-a may clip or chop off peaks of the data signal segment 205 above the clipping threshold 207 and may fill pre-determined values (or, in some implementations, values as indicated by base station 105-a) in their place. Performing such a procedure may result in a clipped data signal 210. Further details of the procedure may be described with reference to FIG. 3. The UE 115-a may transmit the clipped data signal 210 to the base station 105-a. In some implementations, the UE 115-a may transmit the clipped data signal 210 via a data channel or a shared channel (for example, a PUSCH).

The base station 105-a, upon receiving the clipped data signal 210, may perform one or more procedures to generate (for example, or reconstruct) a reconstructed data signal 215, which may be an approximate reconstruction of the data signal segment 205. The base station 105-a may perform such one or more reconstruction procedures because clipped data signals 210 with chopped peaks may have blurrier or less easily decipherable constellations as opposed to reconstructed data signals 215 with reconstructed peaks. In some examples, the one or more reconstruction procedures may involve the base station 105-a receiving a PSIM 230 that indicates a location and amplitude of one or more of the clipped or chopped off peaks. In some implementations, the PSIM 230 may further indicate a phase of the one or more clipped or chopped off peaks. In some implementations, the one or more reconstruction procedures may include the base station 105-a receiving control signaling indicating a clipping threshold 207. The base station 105-a may use the clipped data signal 210, a PSIM 230, and the clipping threshold 207 to generate a reconstructed data signal 215.

Generally, the base station 105-a may transmit control signaling via a control channel (for example, a PDCCH or a dedicated control channel) or in a control message multiplexed on a data channel. The control signaling may indicate a configuration for frequency multiplexing peak suppression information (for example, one or more PSIMs 230) on a PUSCH (for example, the configuration for frequency multiplexing the peak suppression information on the PUSCH may indicate a pattern of REs for the PSIMs 230 on the PUSCH). In some implementations, the control signaling may further include an indication of the clipping threshold 207, an indication that PSIMs 230 may be used by the UE 115-*a*, an indication of a quantity or subset of peaks above the clipping threshold 207 the UE 115-*a* is to include in a PSIM 230, among other examples. The term control signaling, in some examples, may generally refer to PDCCH signaling, downlink control information (DCI), medium access control (MAC) control element (CE) signaling, radio resource control (RRC) signaling, among other examples.

For example, in some implementations (for example, as described with reference to FIG. 7), each symbol (for example, each symbol associated with a PUSCH) may include or hold a PSIM 230 for the previous symbol (for example, to preserve causality). For instance, for a first PUSCH symbol, the data signal segment 205 may represent an uplink data message including a data message 225 (for example, all REs in a first PUSCH symbol may include data). The UE 115-*a* may perform an IFFT of the uplink data message, clip the peaks of the resulting data signal segment 205, and transmit the clipped data signal 210 to the base station 105-*a* via a first PUSCH symbol. The UE 115-*a* may generate a PSIM 230 including information (for example, position, amplitude, phase) of the clipped peaks of the data signal segment 205 associated with the first PUSCH symbol. The PSIM 230, including information corresponding to the portion of the data signal, or the data signal segment, associated with the first PUSCH symbol, may then be multiplexed with a data message 225 in a second or subsequent PUSCH symbol.

As such, for the second PUSCH symbol, data signal segment 205 (or the portion of the data signal associated with the second PUSCH symbol) may represent a data message 225 for the second PUSCH symbol multiplexed with a PSIM including information for reconstructing the uplink data message of the first PUSCH symbol. The UE 115-*a* may perform an IFFT of the second PUSCH symbol uplink data message (including PUSCH data of the second PUSCH symbol and a PSIM corresponding to clipped peak information of the first PUSCH symbol), the UE 115-*a* may clip the peaks of the resulting second PUSCH symbol data signal segment 205, and transmit the clipped data signal 210 to the base station 105-*a* via a second PUSCH symbol. The UE 115-*a* may generate a PSIM 230 including information (for example, position, amplitude, phase) of the clipped peaks of the data signal segment 205 associated with the second PUSCH symbol, and multiplex the PSIM including information corresponding to the data message of the second PUSCH symbol with a data message 225 in a third PUSCH symbol.

That is, the UE 115-*a* may determine an uplink data message for a symbol and generate (for example, based at least in part on an IFFT) a data signal segment 205 for each symbol. The UE 115-*a* may clip the peaks off each data signal segment 205 and generate a PSIM 230 including information on the peaks clipped for the data signal segment 205 of each symbol. The UE 115-*a* may multiplex a generated PSIM 230 on a respective subsequent symbol, such that each multiplexed symbol may then again be clipped while preserving peak suppression information (for example, the PSIM 230) included in the uplink data message (for example, in the data signal segment 205) for the previous symbol. One or more aspects of the techniques described herein may provide for handling of peak suppression information associated with a last symbol of a PUSCH. However, in general, for intermediate symbols (for example, PUSCH symbols between a first PUSCH symbol and a last PUSCH symbol), data signal segment 205 may represent an uplink data message including a data message 225 for the given symbol N and a PSIM 230 for the previous symbol N−1 (for example, in which the PSIM 230 for the previous symbol N−1 includes peak suppression information for a clipped data signal 210 associated with the symbol N−1). For an initial symbol (for example, a first PUSCH symbol), data signal segment 205 may represent an uplink data message including a data message 225 for the first symbol (for example, and PSIM 230 for the first symbol may be included in a second PUSCH symbol subsequent to the first PUSCH symbol).

Figure 3:
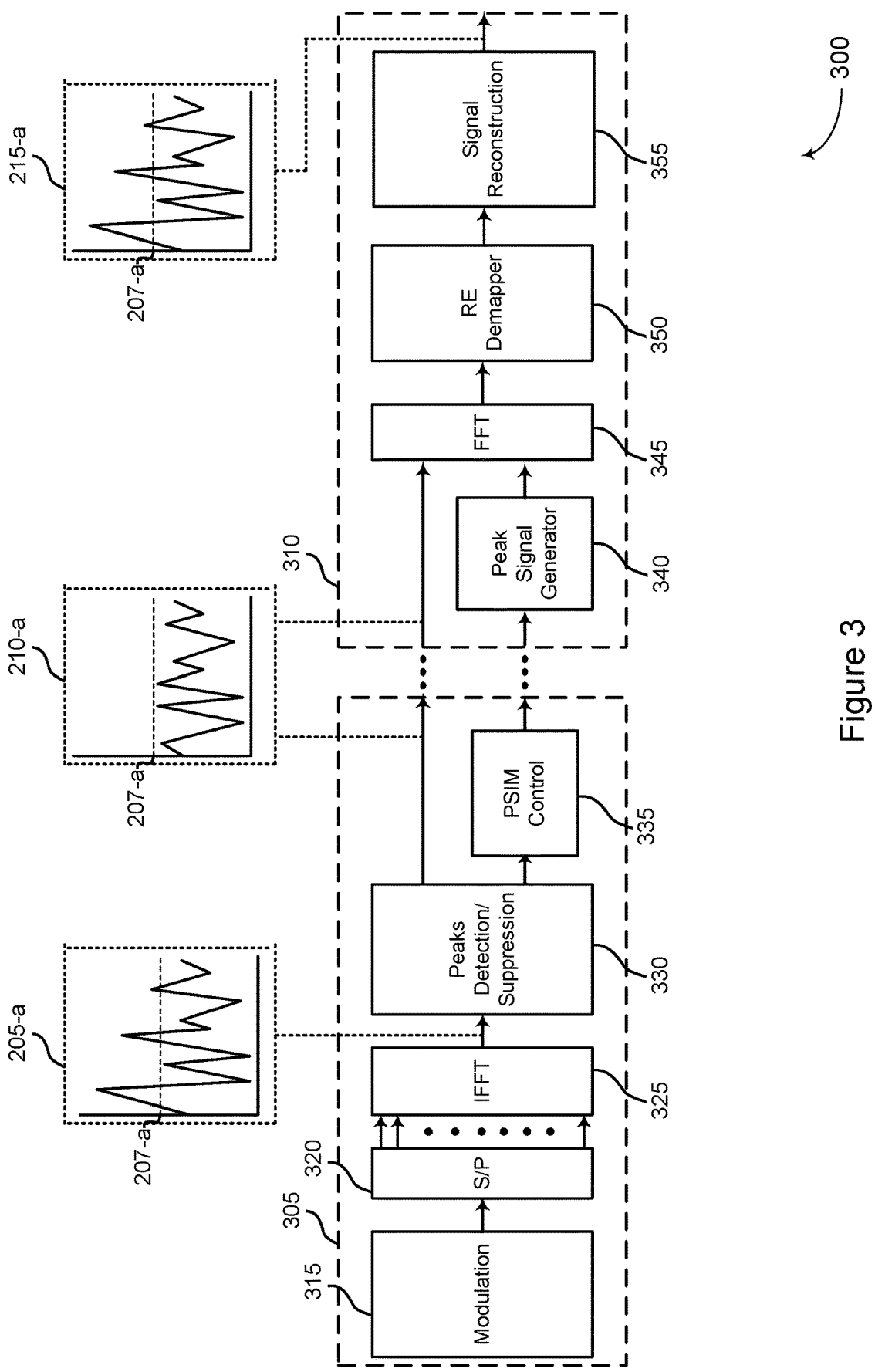
FIG. 3 illustrates an example of a data signal processing chain that supports PSIM multiplexing on a PUSCH in accordance with one or more aspects of the present disclosure.

FIG. 3 illustrates an example of a data signal processing chain 300 that supports PSIM multiplexing on a PUSCH in accordance with one or more aspects of the present disclosure. In some examples, data signal processing chain 300 may implement aspects of wireless communications system 100 or wireless communications system 200. Transmitting device 305 may be an example of a UE 115 and receiving device 310 may be an example of a base station 105 as described with reference to FIGS. 1 and 2. Transmitting device 305 may transmit via a PUSCH (for example, with PSIM multiplexing on the PUSCH) to receiving device 310 in accordance with one or more aspects of the techniques described herein.

For instance, the transmitting device 305 may use modulation component 315 to produce a signal. In some implementations, modulation component 315 may map symbols stored at the transmitting device 305 to signals of particular amplitude and phase. As such, modulation component 315 may produce a signal in the frequency domain according to the amplitude and phase associated with each symbol to be transmitted. Modulation component 315 may also apply a precoding matrix to the signal. Modulation component 315 may output the signal to serial-to-parallel (S/P) component 320, which may perform serial-to-parallel conversion on the signal, and may output the converted signal to IFFT component 325. IFFT component 325 may perform IFFT on the converted signal and may output data signal segment 205-*a* to peak detection and suppression component 330. In some examples, data signal segment 205-*a* may be an example of a data signal segment 205 as described with reference to FIG. 2. Data signal segment 205-*a* may have one or more peaks above clipping threshold 207-*a*.

Peak detection and suppression component 330 may detect the peaks (for example, amplitude peaks) of data signal segment 205-*a*. For instance, peak detection and suppression component 330 may detect each of the peaks of the data signal segment 205-*a* and may determine which of the peaks are above the clipping threshold 207-*a* (for example, above an amplitude peak threshold). Additionally or alternatively, the transmitting device may detect just the peaks that are above the clipping threshold 207-*a*. In either case, peak detection and suppression component 330 may clip off the detected peaks of the in-phase quadrature (IQ) samples data signal segment 205-*a* passing a clipping threshold 207-*a* and may fill pre-determined (or semi-statically configured) values in their place to produce clipped data signal 210-*a*, which may be an example of a clipped data signal 210 as described with reference to FIG. 2. The transmitting device 305 may transmit the clipped data signal 210-*a* to the receiving device 310.

PSIM control component 335 may select which peaks of data signal segment 205-*a* above clipping threshold 207-*a* to indicate to the receiving device 310 via a PSIM. In some implementations, PSIM control component 335 may select or identify a subset of the peaks clipped from data signal segment 205-*a* (for example, a subset of the total number of peaks above clipping threshold 207-*a*). As discussed herein, PSIM control component 335 may select or identify a subset of the peaks to include in a PSIM based on resource availability (a pattern of REs for PSIMs) indicated by the base station, based on significant peak thresholds, based on PSIM redundancy, among other examples. Transmitting device 305 may transmit the PSIM to the receiving device 310 after selecting the subset of the peaks clipped from data signal segment 205-*a* (for example, transmitting device 305 may multiplex the PSIM on a PUSCH to the receiving device 310). The PSIM may indicate each location and amplitude of a clipped peak sample for the subset of the peaks clipped from data signal segment 205-*a*. In some implementations, the PSIM may indicate each phase of a clipped peak sample for the subset of the peaks clipped from data signal segment 205-*a*.

Peaks signal generator 340 may receive the PSIM, decode the PSIM, and may generate peak signals (for example, signals including the indicated peaks) according to the peak suppression information in the PSIM. In some implementations, the peaks signal generator 340 may apply a fast Fourier transform (FFT) (for example, in conjunction with a FFT component 345) to the peaks signal. The peaks signal generator 340 or the FFT component 345 may transmit or pass the peaks signal in the frequency domain to the RE demapper 350. In some implementations, RE demapper 350 may receive clipped data signal 210-*a* and may perform an FFT on the clipped data signal 210-*a* to acquire clipped data signal 210-*a* in the frequency domain. RE demapper 350 may process a data path of clipped data signal 210-*a*, may equalize a channel of clipped data signal 210-*a*, may expand the channel of clipped data signal 210-*a* to obtain a full channel, and may revert or undo the precoding matrix applied by modulation component 315. Signal reconstruction component 355 may combine the clipped data signal 210-*a* and the peaks signal (for example, after processing the data path chest, equalizing the channel, expanding the channel, and reverting the precoding matrix). In some implementations, RE demapper 350 may account for the symbol delay in PSIM for a previous data signal segment 205 (for example, RE demapper 350 may correctly combine peak suppression information included in a PSIM from symbol N with the clipped data signal 210-*a* from symbol N+1). Signal reconstruction component 355 may thus utilize peak suppression information corresponding to the subset of peaks clipped from data signal segment 205-*a* (for example, the time-domain portion or segment of the data signal associated with a symbol N) and indicated by the PSIM (for example, in which the PSIM may be multiplexed on a symbol N+1), but may appropriately not include the peaks not in the subset.

Figure 4A:
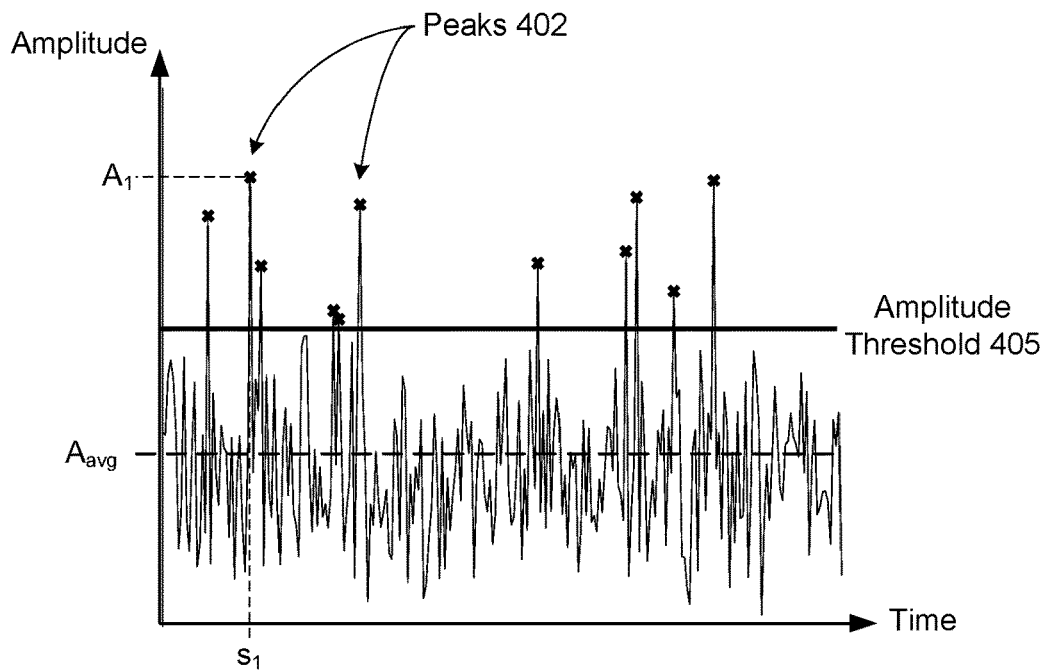
FIG. 4A illustrates an example of a data signal that supports PSIM multiplexing on a PUSCH in accordance with one or more aspects of the present disclosure.
Figure 4B:
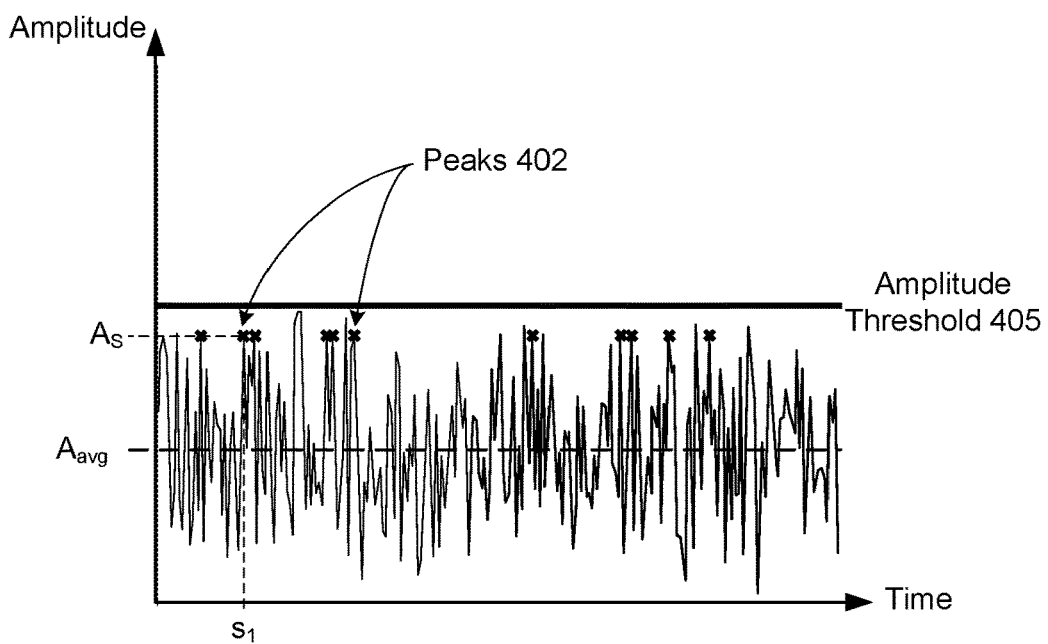
FIG. 4B illustrates an example of a clipped data signal that supports PSIM multiplexing on a PUSCH in accordance with one or more aspects of the present disclosure.

In cases in which a data signal (for example, a data signal segment 205-*a*) includes several peaks higher than the average signal power, the data signal may have high PAPR (as described, for example, with reference to FIGS. 4A and 4B). As such, a transmitting device 305 (for example, a UE for transmission via a PUSCH) may clip or cut off amplitude peaks of the data signal that are above some clipping threshold (for example, to reduce PAPR and further reduce power consumption). However, if a receiving device 310 (for example, a base station) receives the clipped data signal (for example, clipped data signal 210-*a*), the receiving device 310 may experience adverse BER as peak information may be lost as it was clipped from the data signal.

As discussed herein, a receiving device 310 may efficiently (for example, via described PUSCH multiplexing techniques) receive both a clipped data signal 210-*a* as well as a PSIM, such that the receiving device 310 may reconstruct data signal 215-*a* for improved demodulation and improved BER. A transmitting device 305 may clip samples that pass a threshold (for example, a clipping threshold or an amplitude peak threshold). Data describing the clipped sample information may be compressed and transmitted in a PSIM. According to the techniques described herein, the PSIM may be multiplexed on a PUSCH for efficient PSIM signaling and thus efficient PAPR reducing techniques. That is, the PSIM multiplexing on PUSCH techniques described herein may provide for reduced overhead for peak suppression information signaling (compared to implementation of PSIM control regions) and may thus provide for efficient PAPR reduction.

For instance, on a data path between a transmitting device 305 and a receiving device 310, the receiving device 310 may process data path chest and may equalize the channel. The receiving device 310 may expand the channel (for example, reverting the precoding matrix) to obtain the full channel. The receiving device 310 may decode PSIM and reconstruct clipped samples. The receiving device 310 may then obtain frequency domain descriptions of the clipped samples. As such, the receiving device 310 may add back the missing peak samples resulting in reconstructed data signal 215-*a*. The receiving device 310 may reduce the channel and complete data demodulation.

FIGS. 4A and 4B illustrate an example of a data signal 400 and an example of a clipped data signal 401, respectively, in accordance with aspects of the present disclosure. In some examples, example data signal 400 and example clipped data signal 401 may implement aspects of wireless communications system 100 or wireless communications system 200. For example, a UE 115 (for example, as described with reference to FIGS. 1 and 2) may clip an uplink message as illustrated by one or more aspects of data signal 400 to produce a clipped data signal as illustrated by one or more aspects of clipped data signal 401.

FIG. 4A shows an example of a data signal 400 that supports PSIM multiplexing on a PUSCH in accordance with one or more aspects of the present disclosure. In some implementations, the data signal 400 may be one example of a data signal segment 205 (for example, as described with reference to FIGS. 2 and 3). As shown with reference to FIG. 4A, the average amplitude ($A_{avg}$) of the data signal 400 may be less than an amplitude threshold 405 (for example, which may be referred to as a peak amplitude threshold, a clipping threshold, a clipping level, among other examples). In some implementations, the amplitude threshold 405 may be determined based on the average amplitude of the data signal 400 and a target or desired PAPR. For example, the amplitude threshold 405 may be chosen as a cut-off for limiting the PAPR of the data signal 400. However, the data signal 400 may also include a number of peaks 402. Although two of the peaks 402 are highlighted in the example of FIG. 4A, the peaks 402 may include any samples of the data signal 400 having amplitudes that exceed the amplitude threshold 405. Each peak 402 may have a unique position ($s_n$) in the data signal 400, an amplitude ($A_n$), and a phase (not shown for simplicity). For example, the peak 402 at position $s_1$ has an amplitude $A_1$ that is significantly higher than the amplitude threshold 405. The presence of the peaks 402 may significantly increase the PAPR of the data signal 400.

In some implementations, a transmitting device (for example, a UE 115) may be configured to reduce or mitigate the PAPR of the data signal 400 by suppressing the amplitudes of one or more peaks. For example, the peak detection and suppression component 330 may detect one or more peaks in the data signal 400 and generate peak suppression information describing or identifying the detected peaks. A UE may generate a PSIM that may include the positions ($s_n$), amplitudes ($A_n$), and phases (not shown) of the peaks 402. In some aspects, the peak suppression information may be provided to an amplitude suppressor of a transmitting device. The amplitude suppressor may adjust the data signal 400 by reducing or suppressing the amplitudes of the samples associated with the peaks. More specifically, the amplitude suppressor may generate an amplitude-suppressed data signal (for example, a clipped data signal 401) by replacing or substituting each of the peak amplitudes in the data signal 400 with a suppressed amplitude. In some implementations, the suppressed amplitude may be a known or preconfigured amplitude value that is less than or equal to a corresponding amplitude threshold.

FIG. 4B shows an example of a clipped data signal 401 that supports PSIM multiplexing on a PUSCH in accordance with one or more aspects of the present disclosure. In some implementations, the clipped data signal 401 may be one example of the clipped data signal 210 (for example, of FIGS. 2 and 3). More specifically, the clipped data signal 401 may be an example of the data signal 400, of FIG. 4A, after suppressing the amplitudes of the peaks 402. Compared to the data signal 400 of FIG. 4A, the amplitude of the clipped data signal 401 may not exceeds the amplitude threshold 405. More specifically, the amplitude of each of the peaks 402 may be reduced to a suppressed amplitude value ($A_s$) in the clipped data signal 401. In some implementations, each of the peaks 402 may be reduced to the same suppressed amplitude value. In some implementations, different peaks 402 may be reduced to different suppressed amplitude values. The suppressed amplitude values may include any amplitude values less than or equal to the amplitude threshold 405. As a result, the PAPR of the clipped data signal 401 may be significantly lower than the PAPR of the data signal 400 of FIG. 4A.

Aspects of the present disclosure recognize that chopping (or reducing) the peak amplitudes of a data signal may degrade EVM at the transmitter. For example, the EVM of the clipped data signal 401 may be worse than the EVM of the original data signal 400. In some implementations, the UE may provide or otherwise indicate the peak suppression information to the receiving device (for example, the base station) to compensate for the degradation in EVM of the clipped data signal 401. For example, the PSIM control component 335 may generate a PSIM based on the peak suppression information. In some aspects, the PSIM may include raw data representative of the peak suppression information (for example, including the position, amplitude, and phase of each peak).

In some aspects, the PSIM may be compressed. For example, it is noted that an amplitude suppressor (for example, a clipper) may not alter the phases of the data signal 400 when generating the clipped data signal 401. Accordingly, in some implementations, the phase information may be excluded from the PSIM to reduce the overhead of the message. The peak amplitudes also may be represented as polar amplitudes in the PSIM. By using the polar notation, the amplitudes of the peaks may be reduced without changing their phases. Other suitable compression techniques may include, but are not limited to, wavelet compression, per-antenna representation of the position of each peak, analog coding, and limiting the peak position vector to a number of known options. In some implementations, the PSIM control component 335 may compress the peak suppression information by quantizing the peak amplitudes into one or more quantization levels.

Figure 5:
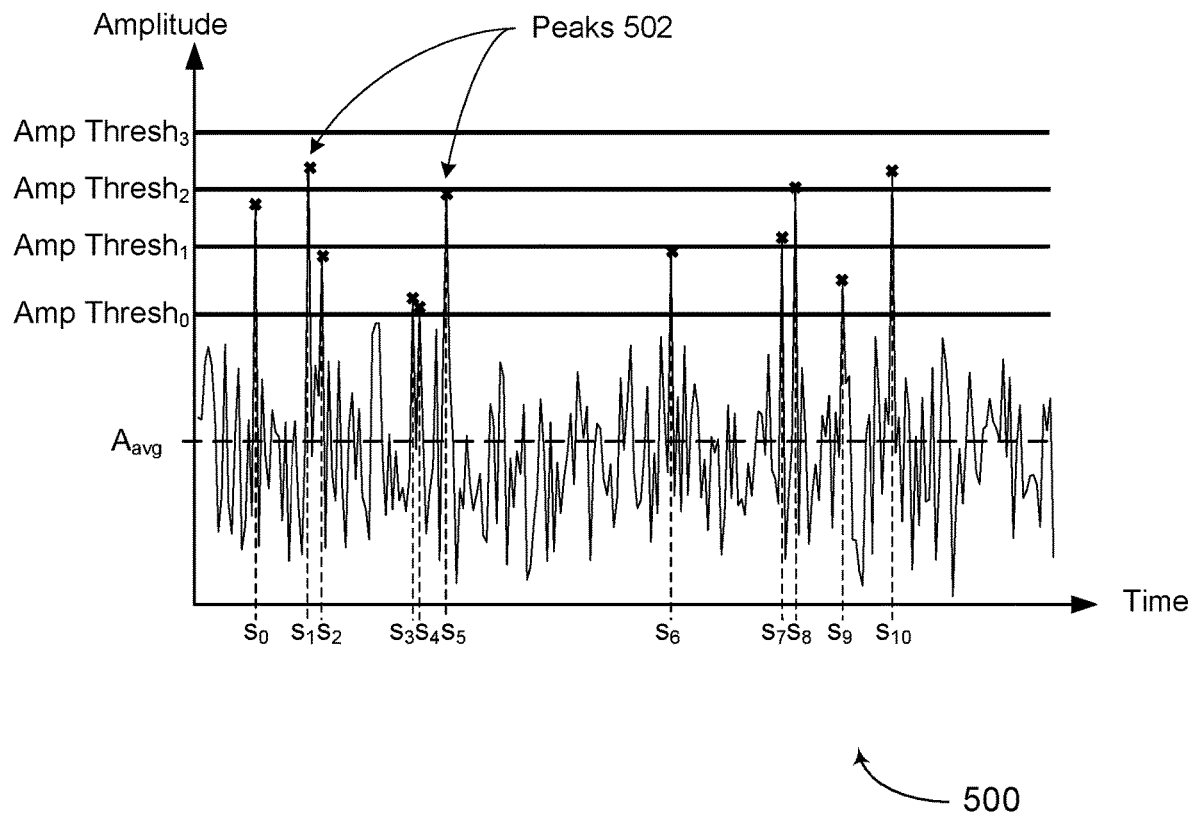
FIG. 5 illustrates an example of a data signal that supports PSIM multiplexing on a PUSCH in accordance with one or more aspects of the present disclosure.

FIG. 5 illustrates an example of a data signal 500 that supports PSIM multiplexing on a PUSCH in accordance with one or more aspects of the present disclosure. In some examples, data signal 500 may implement aspects of wireless communications system 100 or wireless communications system 200. For example, a UE 115 (for example, as described with reference to FIGS. 1 and 2) may clip an uplink message as illustrated by one or more aspects of data signal 500. In some implementations, the data signal 500 may be one example of a data signal segment 205 or a data signal 400 (for example, as described with reference to FIGS. 2, 3, and 4A). As shown with reference to FIG. 5, the average amplitude ($A_{avg}$) of the data signal 500 may be less than various amplitude thresholds (Amp Thresh$_0$, Amp Thresh$_1$, Amp Thresh$_2$, and Amp Thresh$_3$) (for example, which may be referred to as peak amplitude thresholds, clipping thresholds, clipping levels, among other examples).

Although two of the peaks 502 are highlighted in the example of FIG. 5, the peaks 502 may include any samples of the data signal 500 having amplitudes that satisfy any or some combination of amplitude thresholds (Amp Thresh$_0$, Amp Thresh$_1$, Amp Thresh$_2$, and Amp Thresh$_3$). Each peak 502 may have a unique position ($s_n$) in the data signal 500, an amplitude, and a phase. For example, some peaks 502 (for example, amplitude peaks) may have significantly higher amplitude (for example, power amplitude) than any of the amplitude thresholds. The presence of the peaks 502 may increase the PAPR of the data signal 500. Example data signal 500 is shown for illustrative purposes. The techniques described herein may be applicable to other signals (for example, with varying quantity of peaks 502, with varying locations of peaks 502, with varying quantity of amplitude thresholds, with varying locations of amplitude thresholds, among other examples) by analogy, without departing from the scope of the present disclosure.

In some implementations, a transmitting device (for example, a UE 115) may be configured to reduce or mitigate the PAPR of the data signal 500 by suppressing the amplitudes of one or more peaks. For example, the peak detection and suppression component 330, as described with reference to FIG. 3, may detect one or more peaks in the data signal 500 and generate peak suppression information describing or identifying the detected peaks. A UE may generate a PSIM that may include the positions ($s_n$), amplitudes ($A_n$), and phases (not shown) of the peaks 502. In some aspects, the peak suppression information may be provided to an amplitude suppressor of a transmitting device. The amplitude suppressor may adjust the data signal 500 by reducing or suppressing the amplitudes of the samples associated with the peaks. More specifically, the amplitude suppressor may generate an amplitude-suppressed signal (for example, a clipped data signal) by replacing or substituting each of the peak amplitudes in the data signal 500 with a suppressed amplitude. In some implementations, the suppressed amplitude may be a known or preconfigured amplitude value that is less than or equal to a corresponding amplitude threshold.

In some examples, generation of a PSIM may be divided into two stages. For example, a first stage PSIM generation may ensure significant peaks are included (for example, position, amplitude, or phase information is indicated) in a generated PSIM. Significant peaks may include peaks with the most power (for example, amplitude peaks above some stage 1 amplitude threshold), peaks associated with prioritized information, lower amplitude peaks, amplitude peaks within some range, among other examples of selection criteria for the significant peaks. Second stage PSIM generation may include incorporation of residual peaks (for example, remaining peaks, lower priority peaks, lower power peaks or peaks closer in power to the amplitude peak threshold, among other examples). For instance, a UE may determine whether to include all peaks in a PSIM, stage 1 peaks in a PSIM, or whether to generate/transmit no PSIM at all (for example, depending on PUSCH resource availability and modulation and coding scheme (MCS) EVM requirements).

In some examples, data signal clipping or PSIM generation may consider multiple amplitude peak thresholds (for example, or clipping levels) such that the peaks 502 that are clipped or included in a PSIM may be configurable based on the various multiple amplitude peak thresholds. For example, in some implementations, significant peaks (for example, highest power amplitude peaks) may include all peaks 502 exceeding Amp $Thresh_2$ (for example, such that the subset of peaks 502 that exceed Amp $Thresh_2$ may be clipped and included in a PSIM). In other examples, a base station and a UE may determine that significant peaks (for example, peaks corresponding to important information) may include all peaks 502 between Amp $Thresh_0$ and Amp $Thresh_2$ (for example, such that the subset of peaks 502 that are between Amp $Thresh_0$ and Amp $Thresh_2$ may be included in a PSIM, although all peaks 502 exceeding Amp $Thresh_0$ may be clipped and it may be left up to the base station to recover the peak information for peaks 502 exceeding Amp $Thresh_2$ that are not included in the PSIM).

In some implementations, the subset of amplitude peaks 502 that will be clipped and the subset of amplitude peaks 502 that will be included in PSIMs (for example, in which each subset may be based on the same or different amplitude thresholds) may be indicated by the base station to the UE (for example, via control signaling). As such, the UE and base station may determine how uplink data messages are being clipped by the UE, as well as what peaks (for example, or what subset of clipped peaks, such as what significant peaks) will be included in PSIMs multiplexed on a PUSCH (for example, which may enable autonomous signal reconstruction at the base station).

In some implementations, the amplitude thresholds (Amp $Thresh_0$, Amp $Thresh_1$, Amp $Thresh_2$, and Amp $Thresh_3$) may be determined based on the average amplitude ($A_{avg}$) of the data signal 500 and a target or desired PAPR (for example, the smaller amplitude threshold from $A_{avg}$ to which peaks are clipped, the lower PAPR). For example, any of the amplitude thresholds shown may be chosen as a cut-off for limiting the PAPR of the data signal 500 to various levels. In some implementations, the amplitude thresholds (Amp $Thresh_0$, Amp $Thresh_1$, Amp $Thresh_2$, and Amp $Thresh_3$) may be determined based on a target or desired PSIM overhead, a target or desired PSIM reliability, among other examples. For example, significant peaks 502 (for example, the subset of all peaks that are clipped) to be included in PSIMs may be determined based on resource availability or PSIM channel coding (for example, PSIM redundancy). For instance, resource availability (for example, a number of REs available for PSIM in each symbol or in each slot) may determine whether all peaks or whether a subset of significant peaks are to be included in PSIMs. Further, channel coding (for example, redundancy) of PSIMs may further determine whether all peaks or whether a subset of significant peaks are to be included in PSIMs (for example, as if PSIM REs are repeated for increased PSIM redundancy and reliability, the number of REs available for less significant peaks may be reduced).

Figure 6:
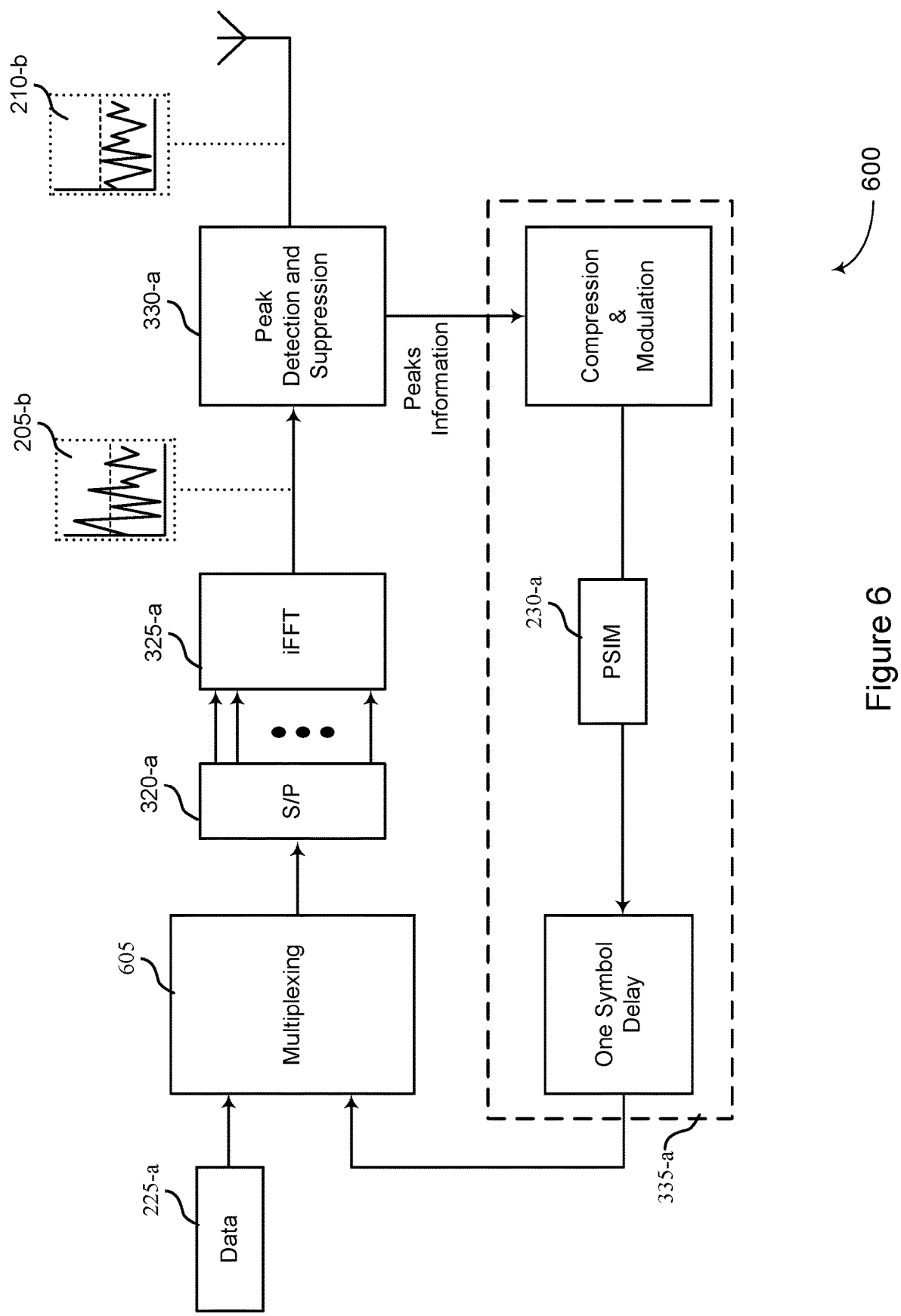
FIG. 6 illustrates an example of a data signal processing chain that supports PSIM multiplexing on a PUSCH in accordance with one or more aspects of the present disclosure.

FIG. 6 illustrates an example of a data signal processing chain 600 that supports PSIM multiplexing on a PUSCH in accordance with one or more aspects of the present disclosure. In some examples, data signal processing chain 600 may implement aspects of wireless communications system 100 or wireless communications system 200. For example, a UE 115 (for example, as described with reference to FIGS. 1 and 2) or a transmitting device (for example, as described with reference to FIG. 3) may implement one or more aspects of data signal processing chain 600 to clip a data signal segment 205-b (for example, resulting in a clipped data signal 210-b) and multiplex PSIMs 230-a (for example, PSIM 230-a including position, amplitude, or phase information of samples clipped from data signal segment 205-b) on a PUSCH. In some implementations, data signal processing chain 600 may illustrate one or more aspects as further described with reference to data signal processing chain 300.

A UE may multiplex PSIMs 230-a and data messages 225-a (for example, on a PUSCH) via multiplexing component 605. In some examples, (for example, as will be described with reference to FIG. 7), data signal processing chain 600 may illustrate a configuration for frequency multiplexing peak suppression information on a PUSCH in which each PUSCH symbol may include data in addition to a PSIM for a previous PUSCH symbol (for example, such that causality is preserved when multiplexing PSIM and data for each PUSCH symbol). As such, multiplexing component 605 may multiplex a data message 225-a with a PSIM 230-a corresponding to a clipped data signal (for example, a clipped data message) of a previous symbol. In other words, PSIMs 230-a may be multiplexed on a PUSCH according to a one symbol delay.

In some examples, PSIM control component 335-a may be an example of PSIM control component 335 as described with reference to FIG. 3. For example, PSIM control component 335-a may generate and otherwise control PSIMs 230-a. For instance, PSIM control component 335-a may obtain peaks information from peak detection and suppression component 330-a and may determine a quantity of peaks (for example, all clipped peaks, a subset of significant peaks, among other examples) to include in PSIM 230-a. Further, PSIM control component 335-a may compress and modulate peaks information (for example, into the position(s) of each peak of each symbol, the amplitude(s) of each peak of each symbol, or the phase(s) of each peak of each symbol) such that each PSIM 230-a may include clipping information for a symbol N. The PSIM control component 335-a may delay each PSIM 230-a such that multiplexing component 605 may multiplex the PSIM 230-a (include clipping information for the symbol N) on a subsequent symbol N+1.

In some implementations, generation of a PSIM 230-a may be divided into two stages. For example, a first stage PSIM generation may ensure significant peaks are included in (for example, position, amplitude, or phase information is indicated by) a generated PSIM. Significant peaks may include peaks with the most power (for example, amplitude peaks above some stage 1 amplitude threshold), peaks associated with prioritized information, lower amplitude peaks, amplitude peaks within some range, among other examples. In cases in which enough resources are available, residual peaks (for example, or remaining peaks, peaks with less amplitude relative to a significant subset of peaks, among other examples) may be included in the PSIM 230-a.

After multiplexing data message 225-*a* with a PSIM 230-*a* including clipping information for the previous symbol (symbol N−1), multiplexing component 605 may output the signal to S/P component 320-*a*, which may perform serial to parallel conversion on the signal. S/P component 320-*a* may output the converted signal to IFFT component 325-*a*. IFFT component 325-*a* may perform IFFT on the converted signal and may output data signal segment 205-*b* a to peak detection and suppression component 330-*a*. As discussed, in the present example, data signal segment 205-*b* may include data message 225-*a* (for example, corresponding to a symbol N) multiplexed in frequency with PSIM 230-*a* (for example, corresponding to symbol N−1). Peak detection and suppression component 330-*a* may then clip the peaks (for example, the amplitude peaks) off of data signal segment 205-*b* and the UE may transmit clipped data signal 210-*b* to a base station. The peaks information or clipping information associated with the clipping of the data signal segment 205-*b* (for example, including the data message 225-*a* corresponding to a symbol N multiplexed in frequency with the PSIM 230-*a* corresponding to symbol N−1) may then be included in a next PSIM 230-*a* to be multiplexed on a subsequent symbol N+1.

In some implementations, if MIMO is employed, PSIM may have the same number of layers as the PUSCH data. In some implementations, the UE may determine the MIMO layer configuration (for example, how PSIMs are implemented across one or more layers of a MIMO layer configuration). In some implementations, a UE may transmit the same PSIM symbols in all layers (for example, the peak suppression information may be repeated across all layers of a MIMO layer configuration) to increase PSIM robustness. In other cases, the UE may transmit the same PSIM in a subset of layers. For instance, in some implementations 4 MIMO layers may be configured, and the 4 MIMO layers may be divided into two sets of 2 layers, in which PSIMs are repeated over each respective set of two layers. For some PSIM MIMO configurations, PSIMs may be divided between layers (for example, similar to PUSCH data). In other words, PSIM may be divided onto each layer of the MIMO configuration (for example, no PSIM repetition across layers, which may result in increased PSIM throughput). In some implementations, if target PAPR is low and number of peaks is large, the PSIM MIMO configuration may be similar to the MIMO configuration for PUSCH. If target PAPR is high and the number of peaks is small, the PSIM MIMO configuration may have less layers than the MIMO configuration for PUSCH.

Figure 7:
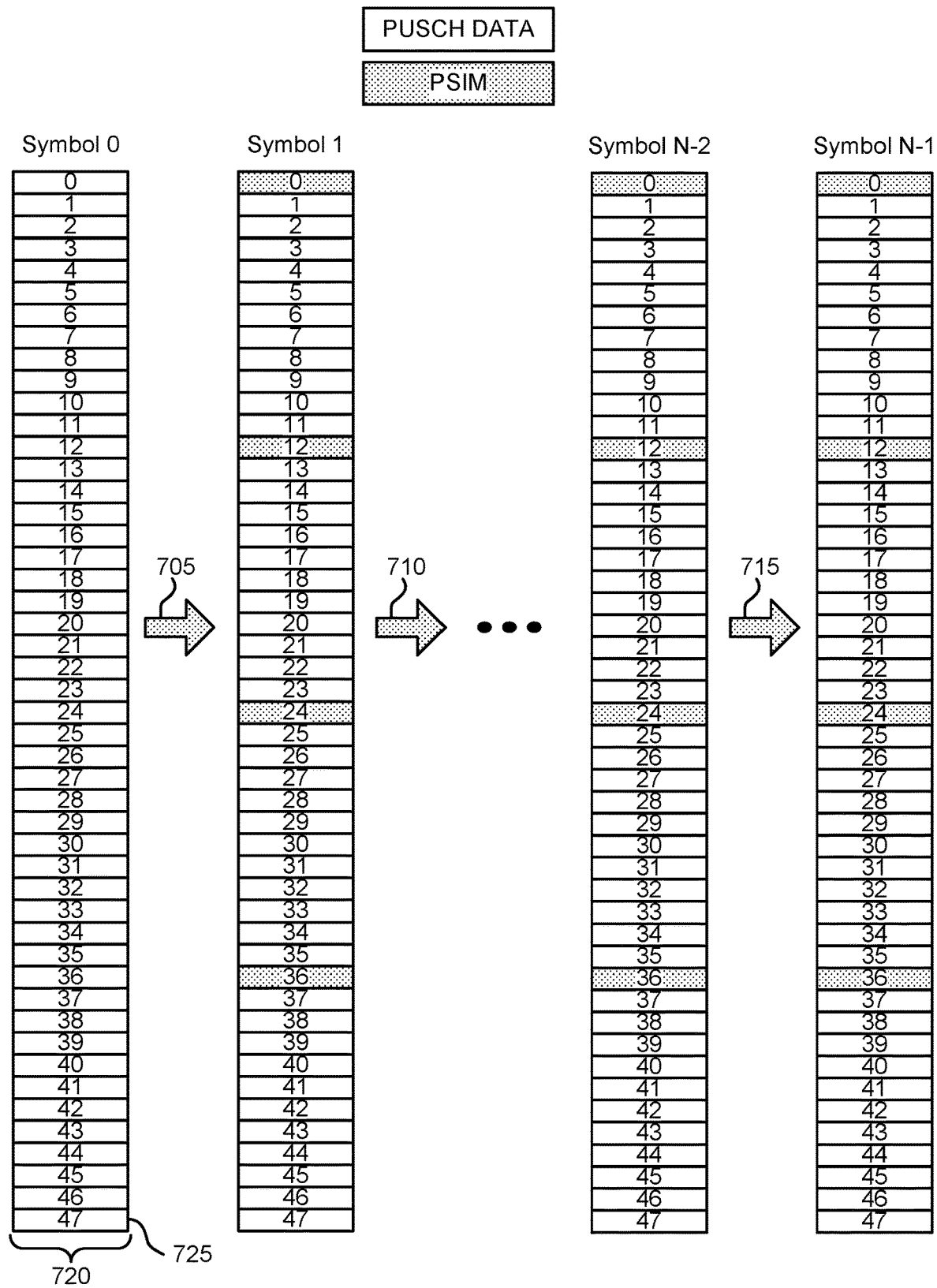
FIG. 7 illustrates an example of a multiplexing configuration that supports PSIM multiplexing on a PUSCH in accordance with one or more aspects of the present disclosure.

FIG. 7 illustrates an example of a multiplexing configuration 700 that supports PSIM multiplexing on a PUSCH in accordance with one or more aspects of the present disclosure. In some examples, multiplexing configuration 700 may implement aspects of wireless communications system 100 or wireless communications system 200. For example, a UE may multiplex peak suppression information on one or more symbols of a PUSCH in accordance with one or more aspects of multiplexing configuration 700. Further, a base station may receive, process, and decode the PUSCH in accordance with one or more aspects of multiplexing configuration 700. A symbol (for example, symbol 0, symbol 1 . . . symbol N−2, symbol N−1) may be associated with a symbol period 720 (for example, in the time domain). Further, multiplexing configuration 700 may illustrate a multiplexing configuration of REs 725 (for example, PUSCH REs 725). In some examples, an RE 725 may span a symbol period 720 in the time domain and a sub-carrier in the frequency domain. As described, a configuration for frequency multiplexing peak suppression information on a PUSCH may include a configuration of REs 725 configured for PSIM frequency multiplexed with REs 725 configured for the PUSCH.

Multiplexing peak suppression information on a PUSCH may provide for efficient PAPR reduction techniques (for example, and thus reduced power consumption at a transmitting UE). For instance, in some systems, PSIMs may be implemented or defined as a separate control message (for example, over a separate symbol). For example, a subframe may include 14 symbols (symbols 0-13), in which a first symbol (symbol 0) and a tenth symbol (symbol 9) may include demodulation reference signal (DMRS) for the PUSCH, a twelfth symbol (symbol 11) may include PSIM (including data and pilots), a thirteenth symbol (symbol 12) and a fourteenth symbol (symbol 13) may include a physical uplink control channel (PUCCH) (including data and pilots), and the remaining symbols (symbol 1 through symbol 8 and symbol 10) may include the PUSCH. In some of such examples, a control region (for example, in a symbol 11 or in a symbol before the PUCCH) may include one or more PSIMs corresponding to modulated PUSCH data symbols that are clipped in the time domain.

However, in such cases in which uplink PSIMs are implemented as a separate control message or over a separate symbol (for example, absent the described techniques for peak suppression information multiplexing on the PUSCH), the uplink PSIM may be defined in symbol granularity which may increase overhead in some implementations. In other words, multiplexing peak suppression information multiplexing on the PUSCH may result in less overhead for peak suppression information compared to overhead associated with a dedicated control region over a symbol for uplink PSIM. Further, in cases in which systems that implement PSIMs as a separate control message attempt to frequency division multiplex (FDM) PSIM and a data message, the PSIM may change the peaks picture and thus may make the system not causal. Moreover, in cases in which systems that implement PSIMs as a separate control message or over a separate symbol, the symbol including the PSIMs may not support time domain clipping (for example, as there may be nowhere else configured to include a PSIM for the PSIM symbol) which may result in high PAPR for the PSIMs as a separate control message or over a separate symbol.

Further, absent the techniques described herein a receiving device (a base station) may allocate a buffer for data symbols, which may be associated with increased latency and memory (or buffer) costs. That is, in other systems in which uplink PSIMs are implemented as a separate control message or over a separate symbol, a base station may implement a buffer to store data symbols in order to wait for decoding of the uplink PSIM in order to be able to reconstruct the data symbols (as the uplink PSIM may include the peak suppression information for the received data symbols, such that the data symbols may be buffered until receipt of the uplink PSIM before reconstruction of uplink data messages is possible). Moreover, in cases in which uplink PSIM REs are multiplexed on the same symbol as the data signal that was clipped, the uplink PSIM addition may add peaks of its own to the clipped data signal (which may thus regrow some peaks and increase PAPR for the originally clipped data signal).

As such, the techniques described herein may provide for more efficient implementation of PSIMs via efficient multiplexing of the peak suppression information on the PUSCH. Example multiplexing configuration 700 may illustrate one or more aspects of techniques for peak suppression information multiplexing on the PUSCH. Various other configurations for frequency multiplexing peak suppression information on the PUSCH are considered by analogy, without departing from the scope of the present disclosure. For instance, example multiplexing configuration 700 may illustrate a configuration for frequency multiplexing peak suppression information on the PUSCH in which each PUSCH symbol may include data in addition to a PSIM for a previous PUSCH symbol (for example, such that causality is preserved when multiplexing PSIM and data for each PUSCH symbol). However, in other examples, frequency multiplexing of peak suppression information on the PUSCH may be configured such that each PUSCH symbol may include data in addition to a PSIM for that same PUSCH symbol, such that each PUSCH symbol may include data in addition to a PSIM for a subsequent PUSCH symbol, among other examples.

Further, example multiplexing configuration 700 may illustrate a configuration for frequency multiplexing peak suppression information on the PUSCH in which the pattern of REs for the peak suppression information on the PUSCH start at a sub-carrier index 0 and repeat every 12 subcarriers. However, generally frequency multiplexing of peak suppression information on the PUSCH may be configured with any pattern of REs including different subcarrier offsets (for example, a configured pattern of REs for the peak suppression information on the PUSCH may begin on a sub-carrier index indicated by some sub-carrier offset, may be repeated according to any periodicity or spacing across sub-carriers in frequency, among other examples).

In some examples (for example, as illustrated in example multiplexing configuration 700), peak suppression information (for example, PSIMs) may be divided into several REs in the PUSCH. Generally, a base station may indicate (for example, via control signaling) information on whether or not data signal clipping and corresponding PSIMs are to be implemented by the UE. The base station may further indicate information on the configuration for frequency multiplexing peak suppression information on the PUSCH (for example, such as a pattern of REs for uplink PSIMs, uplink PSIM MCS, uplink PSIM MIMO configuration), among other examples. For example, a PDCCH may include information on uplink PSIM patterns (for example, a pattern of PUSCH REs for PSIMs). In some implementations, PSIM patterns within the PUSCH may be configurable based on target PAPR and target throughput considerations. More aggressive reduction of PAPR may result in more REs used for PSIMs. However, higher throughput targets may result in less REs for PSIM. In some examples, a configuration for frequency multiplexing the peak suppression information on the PUSCH may indicate a pattern of REs for the peak suppression information on the PUSCH. The pattern of REs may be configured based on resource availability (for example, based on how many REs in a symbol or a slot are available for PSIMs), based on channel conditions (for example, the periodicity or spacing of REs for PSIMs may be based on channel conditions or blockers associated with frequency of the channel), among other examples.

To preserve the causality or deterministic ability to reconstruct each PUSCH symbol at a receiving device (for example, at a base station), a transmitting device (for example, a UE) may multiplex a PUSCH such that each symbol holds PSIM for the previous symbol. For instance, each symbol (for example, symbol 0, symbol 1 . . . symbol N−2, symbol N−1) may hold PSIM generated based on the data signal clipping of the previous symbol. For example, symbol 1 may include PSIM for symbol 0 multiplexed with data. At 705, a UE may perform an IFFT for a modulated symbol 0, clip one or more amplitude peaks from the resulting time-domain data signal, and calculate the PSIM for symbol 0 based on the clipping. The UE may then multiplex the PSIM for symbol 0 with PUSCH data on symbol 1. At 710, the UE may similarly calculate PSIM for symbol 1 and may multiplex the PSIM for symbol 1 with PUSCH data on symbol 2. Generally, at 715, the UE may perform an IFFT for a modulated symbol N−2, clip one or more amplitude peaks from the resulting time-domain data signal, and calculate the PSIM for symbol N−2 based on the clipping. The UE may then multiplex the PSIM for symbol N−2 with PUSCH data on symbol N−1. As such, the added peaks of a symbol due to the incorporation of PSIM for the previous symbol may be accounted for in the PSIM of the subsequent symbol.

In some implementations, PSIM may be positioned uniformly over frequency (for example, every 12 sub-carriers, although other patterns of REs associated with different periodicities, different spacings, different groupings, among other examples are considered by analogy). In some implementations, each symbol PSIM message me be included in a different transport block (TB) than PUSCH data (for example, such that the PSIM and the PUSCH data may go through a channel decoder at a receiving, device, separately). In other cases, each symbol PSIM message me be included in a same TB as PUSCH data. In some examples, PSIM may share the same MCS of the PUSCH data. In other examples, PSIM may have a different (for example, lower) MCS than the PUSCH data. Further, in some implementations, PSIM channel coding may be different than the PUSCH data (for example, and may have larger redundancy to ensure negligible data detection errors). For instance, in some implementations channel coding for PSIM may provide for more redundancy such that PSIMs are relatively robust compared to PUSCH data (for example, as PSIM payload may be pertinent for successful decoding of the previous symbol, as without peak information a receiver may be unable to decode the entire previous symbol). In some implementations, channel coding for PSIM may be the same as channel coding for PUSCH data.

Further, a configuration for frequency multiplexing peak suppression information on a PUSCH may specify where PSIM may be located for a last symbol. For instance, as illustrated by multiplexing configuration 700, PSIM for a last symbol in a slot (for example, symbol N−1) may not be associated with a subsequent symbol for PSIM multiplexing (for example, as the last symbol in the slot may be the last symbol remaining relative to other symbols of the slot). As such, configuration for frequency multiplexing peak suppression information on a PUSCH may specify a location for the PSIM corresponding to the last symbol. In some implementations, the PSIM corresponding to the last symbol may be located in the PUCCH message, may be multiplexed in the first symbol of a next slot, among other examples. Alternatively, a last symbol may be configured such that the last symbol may not require PSIM (for example, and PSIM for a last symbol may be skipped). In some implementations, an MCS may be placed on the last symbol such that the MCS is associated with less EVM and may be more robust to clipping.

Additionally, in some implementations the configuration for frequency multiplexing peak suppression information on a PUSCH may be based at least in part on a priority ($\beta$) of the uplink PSIM. That is, as the uplink PSIM may use the same resources as uplink data and other uplink control information (UCI) that may be multiplexed to the PUSCH, the base station may control the priority (β) of the uplink PSIM (ULPSIM) (for example, by configuring $\beta_{offset}^{ULPSIM}$). In some implementations, $\beta_{offset}^{ULPSIM}$ may be preconfigured or specified by the network. Additionally or alternatively, $\beta_{offset}^{ULPSIM}$ may be indicated by a base station (for example, semi-statically via RRC signaling, dynamically via DCI in a PDCCH, among other examples). The network or the base station may configure $\beta_{offset}^{ULPSIM}$ in order to control which information is more applicable for the UE to multiplex on available resources of the PUSCH. In some implementations, the quantity of REs, the pattern of REs, or both, used available for multiplexing PSIM on the PUSCH may depend on $\beta_{offset}^{ULPSIM}$ (or may depend on $\beta_{offset}^{ULPSIM}$ relative to the β of data, β of other UCI such as CSI-RS, among other examples). In some implementations, the network or the base station may configure $\beta_{offset}^{ULPSIM}$ based on the importance of the peaks (amplitude peaks) clipped by the UE (for example, which may be based on the target PAPR or PAPR reduction level, the clipping threshold, the priority of traffic from the UE, among other examples).

Figure 8:
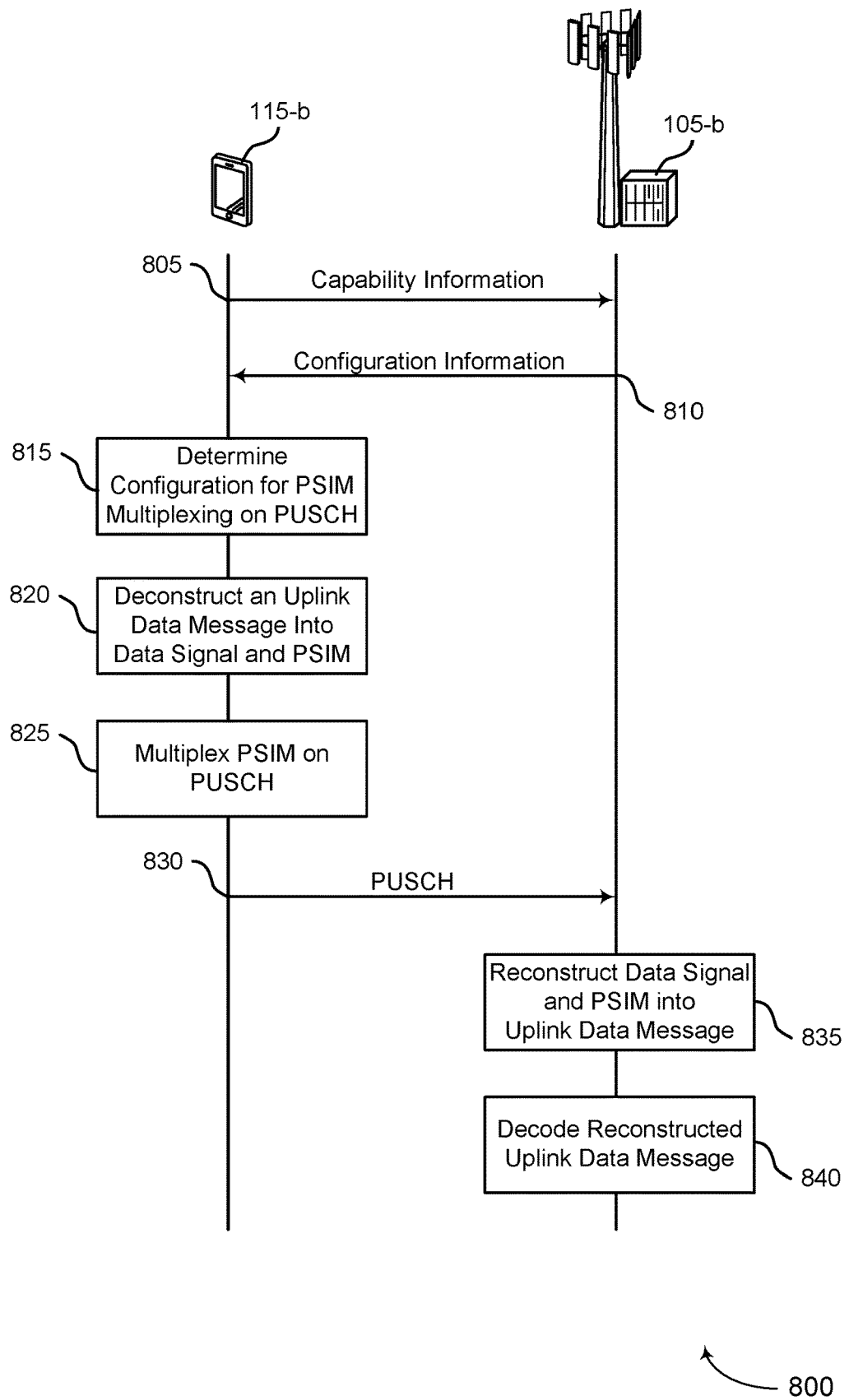
FIG. 8 illustrates an example of a process flow that supports PSIM multiplexing on a PUSCH in accordance with one or more aspects of the present disclosure.

FIG. 8 illustrates an example of a process flow 800 that supports PSIM multiplexing on a PUSCH in accordance with one or more aspects of the present disclosure. In some examples, process flow 800 may implement aspects of the techniques described with reference to FIGS. 1-7. Process flow 800 may be implemented by a UE 115-b and a base station 105-b, which may be examples of a UE 115 and a base station 105 described with reference to FIGS. 1 and 2. In the following description of the process flow 800, the operations between the UE 115-b and the base station 105-b may be transmitted in a different order than the order shown, or the operations performed by the base station 105-b and the UE 115-b may be performed in different orders or at different times. Some operations may also be left out of the process flow 800, or other operations may be added to the process flow 800. While the base station 105-b and the UE 115-b are shown performing a number of the operations of process flow 800, any wireless device may perform the operations shown.

At 805, the UE 115-b may transmit a capability indication to the base station 105-b. In some implementations, the capability may be a capability of the UE 115-b to support (for example, decode) PSIMs, a capability of the UE 115-b to perform signaling clipping, the capability of the UE 115-b to multiplex peak suppression information on a PUSCH, or some combination thereof. The capability indication may include one or more bits indicating if the UE 115-a has such capabilities. For example, in some implementations, the capability indication may include a single bit to indicate the UE 115-b is capable of multiplexing peak suppression information on the PUSCH, and thus may implicitly indicate the UE 115-b is capable of data signal clipping and supporting PSIMs. In other implementations, the capability indication may include an explicit indication for each capability of the UE 115-b relating to peak suppression information multiplexing on the PUSCH. In some implementations, the indication may be transmitted via RRC signaling. Additionally or alternatively, capability information may be transmitted via a PUCCH (for example, after receiving the configuration at 810, the UE 115-b may indicate in the PUCCH associated with a PUSCH transmission whether or not the PUSCH transmission includes peak suppression information multiplexing).

At 810, the base station 105-b may transmit control signaling to the UE 115-b. Generally, the control signaling may indicate whether uplink clipping and uplink PSIMs are to be implemented by the UE 115-b, where uplink PSIMs are to be located (for example, a pattern of PUSCH REs for peak suppression information, including an index of where uplink PSIM REs start, an offset of where uplink PSIM REs start, a spacing or periodicity of uplink PSIM REs, among other examples), MCS for uplink PSIMs, channel coding for uplink PSIMs, MIMO configuration for uplink PSIMs, whether uplink PSIM messages will be associated with a same or different TB as PUSCH data, among other examples. Further, in some implementations, the control signaling may indicate a clipping level (for example, one or more peak amplitude thresholds) to be applied by the UE 115-b to generate (clip) uplink data signals. In some examples, the control signaling may indicate what clipping information may be including in uplink PSIMs (for example, whether all peaks clipped by the UE 115-b or a subset of significant peaks clipped by the UE 115-b will be included in uplink PSIMs). In some implementations, in cases in which a subset of clipping information is included in PSIMs, the base station 105-b may indicate what criteria is to be used for the UE 115-b determination of what clipping information to include in uplink PSIMs (for example, what peak amplitude thresholds are being used for uplink PSIM generation, what information or frequency range is associated with peaks included in uplink PSIMs, among other examples).

Further, as discussed herein, control signaling to the UE 115-b may include a priority (β) of the uplink PSIM. That is, as the uplink PSIM may be configured to use the same PUSCH resources as uplink data and other UCI, the base station 105-b may control the priority (β) of the uplink PSIM (ULPSIM) (for example, by configuring $\beta_{offset}^{ULPSIM}$) in order to control UE 115-b arrangement (or prioritization) of PUSCH REs. For instance, the configuration for frequency multiplexing peak suppression information on the PUSCH may be based on $\beta_{offset}^{ULPSIM}$ in addition to, or relative to, β of other UCI associated with PUSCH multiplexing (for example, such as CSI-RS, HARQ feedback, among other examples). Moreover, the configuration for frequency multiplexing peak suppression information on the PUSCH may be based on available uplink resources, data throughput targets, among other examples. For example, in cases in which a limited amount of REs are available for PUSCH piggybacking and both CSI-RS and PSIM are available for uplink, the UE 115-b may compare the priority of CSI-RS and PSIM to determine whether to use some or all of the available REs for either CSI-RS or PSIM. In some implementations, uplink PSIM may be associated with a higher priority that CSI-RS (for example, $\beta_{offset}^{ULPSIM} > 0$, relative to $\beta^{CSI-RS}$).

At 815, the UE 115-b may determine a configuration for multiplexing peak suppression information on a PUSCH. For example, the UE 115-b may determine a pattern of REs for the peak suppression information on the PUSCH, in which the configuration for multiplexing peak suppression information on the PUSCH indicates the pattern. The PSIM multiplexing configuration (for example, the configuration for multiplexing peak suppression information on the PUSCH) may be determined based on resource availability (for example, a number of REs available for uplink peak suppression information), PAPR reduction thresholds (for example, one or more amplitude peak thresholds or clipping levels used to clip PUSCH signals), among other examples. In some implementations, the configuration may be determined based on a MIMO configuration (for example, a number of MIMO layers used for communications with the base station 105-b). In some examples, the configuration may be based on throughput targets, PSIM overhead, among other examples. In some examples, the configuration for multiplexing peak suppression information on a PUSCH may be based on the capability indication transmitted at 805, the configuration information received at 810, or both.

At 820, the UE 115-*b* may deconstruct an uplink data message into a data signal and the peak suppression information (the uplink PSIM). In other words, the UE 115-*b* may determine or identify a data signal (for example, data message 225) and peak suppression information (for example, uplink PSIM 230) to be multiplexed in frequency for a PUSCH symbol. As discussed herein, in some examples deconstructing (which may be referred to as, for example, determining, identifying, among other examples) an uplink data message into a data signal and the peak suppression information may include clipping an uplink data message associated with a symbol N (which may include a data signal for symbol N and a PSIM for a symbol N−1) and generating an uplink PSIM to be multiplexed on a PUSCH symbol N+1 (for example, the generated PSIM including the clipping information for the symbol N).

At 825, the UE 115-*b* may multiplex peak suppression information on the PUSCH (for example, the UE 115-*b* may frequency multiplex the data signal with the peak suppression information based at least in part on the configuration determined at 815). Generally, the multiplexing may include multiplexing the data signal with a PSIM associated with a previous symbol (for example, as described in more detail herein, for example, with reference to FIG. 7), a PSIM associated with the current symbol, or a PSIM associated with a subsequent symbol.

At 830, the UE 115-*b* may transmit, on the PUSCH according to the determined configuration, the peak suppression information frequency multiplexed with the data signal in a first slot. As such, the base station 105-*b* may receive, on the PUSCH based at least in part on multiplexing configuration (for example, determined based on control signaling transmitted at 810), the peak suppression information frequency multiplexed with a data signal in the first slot.

At 835, base station 105-*b* may reconstruct an uplink data message (for example, the base station 105-*b* may determine a reconstructed data signal 215) based at least in part on the received data signal and the received peak suppression information. For example, for some multiplexing configurations, the base station 105-*b* may reconstruct the uplink data message based at least in part on the data signal received in a first symbol period of the PUSCH and the peak suppression information received in a second symbol period of the PUSCH, the second symbol period after the first symbol period. For other multiplexing configurations, the base station 105-*b* may reconstruct the uplink data message based at least in part on the peak suppression information received in a first symbol period of the PUSCH and the data signal received in a second symbol period of the PUSCH, the second symbol period after the first symbol period. For other multiplexing configurations, the base station 105-*b* may reconstruct the uplink data message based at least in part on the data signal received in a same symbol period of the PUSCH as the peak suppression information. For other multiplexing configurations, the base station 105-*b* may reconstruct the uplink data message based at least in part on the data signal received in a last symbol period of the PUSCH (of the first PUSCH slot) and the peak suppression information which may be received in a first symbol of a second slot (a second PUSCH slot subsequent to the first PUSCH slot).

At 840, the base station 105-*b* may decode the uplink data message reconstructed at 835.

Figure 9:
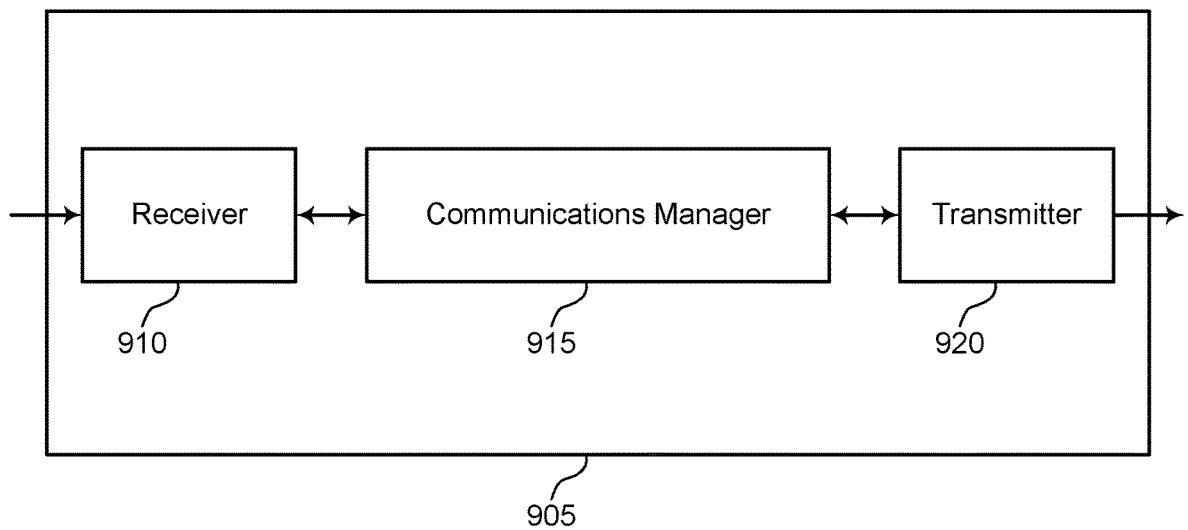
FIGS. 9 and 10 show block diagrams of devices that support PSIM multiplexing on a PUSCH in accordance with one or more aspects of the present disclosure.

FIG. 9 shows a block diagram of a device 905 that supports PSIM multiplexing on a PUSCH in accordance with one or more aspects of the present disclosure. The device 905 may be an example of aspects of a UE 115 as described with reference to FIG. 1. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to PSIM multiplexing on a PUSCH, among other examples). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a configuration for frequency multiplexing a peak suppression information on an uplink shared channel, deconstruct an uplink data message into a data signal and the peak suppression information, frequency multiplexing the data signal with the peak suppression information based on the determined configuration, and transmit, on the uplink shared channel in a first slot according to the determined configuration, the peak suppression information frequency multiplexed with the data signal in a first slot.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit data signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas. In some implementations, the transmitter 920 may include or may be coupled with a PA.

Figure 10:
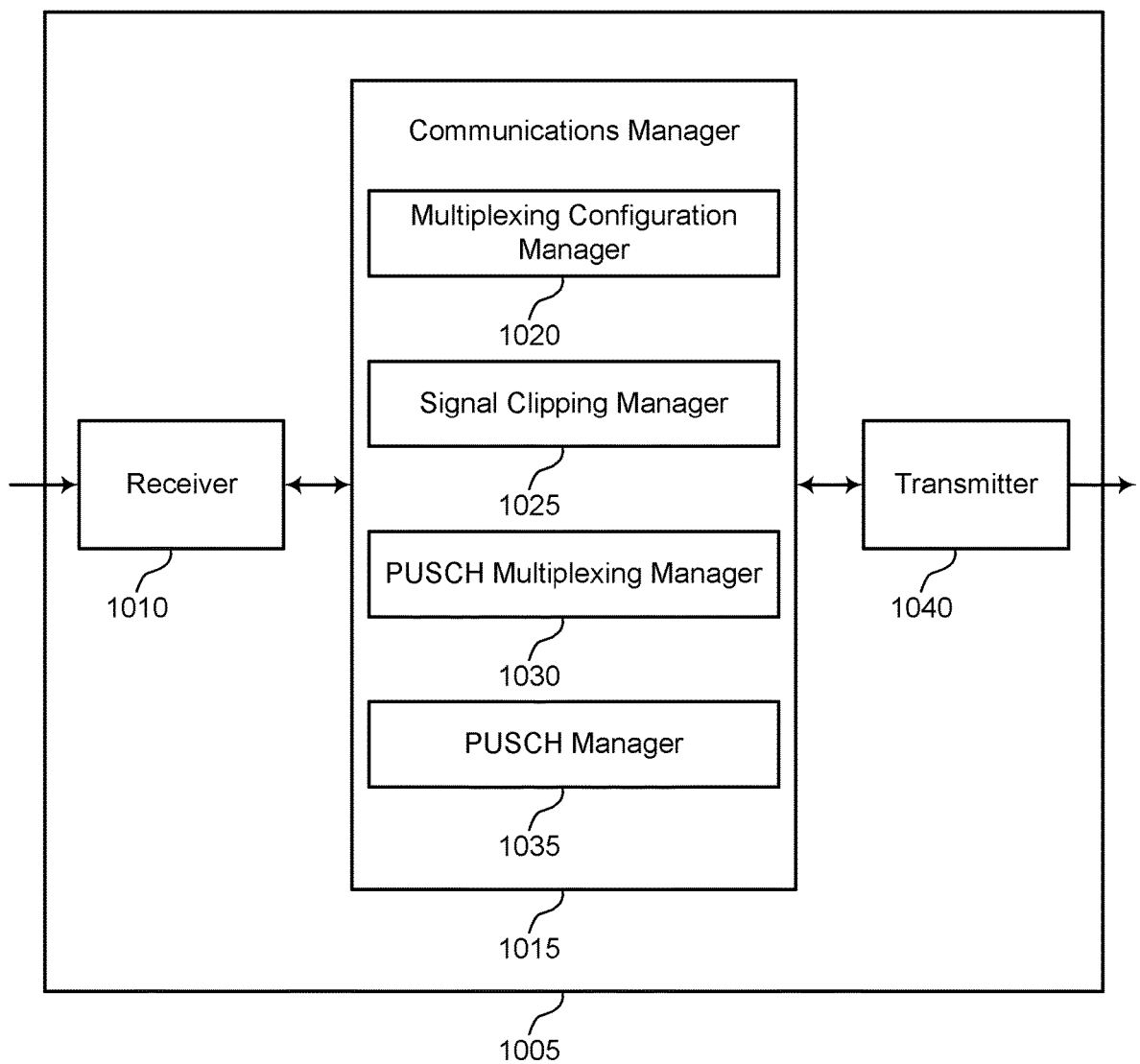

FIG. 10 shows a block diagram of a device 1005 that supports PSIM multiplexing on a PUSCH in accordance with one or more aspects of the present disclosure. The device 1005 may be an example of aspects of a device 905, or a UE 115 as described with reference to FIG. 1. The device 1005 may include a receiver 1010, a communications manager 1015, and a transmitter 1040. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to PSIM multiplexing on a PUSCH, among other examples). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may include a multiplexing configuration manager 1020, a signal clipping manager 1025, a PUSCH multiplexing manager 1030, and a PUSCH manager 1035.

The multiplexing configuration manager 1020 may determine a configuration for frequency multiplexing a peak suppression information on an uplink shared channel. The signal clipping manager 1025 may deconstruct an uplink data message into a data signal and the peak suppression information. The PUSCH multiplexing manager 1030 may frequency multiplex the data signal with the peak suppression information based on the determined configuration. The PUSCH manager 1035 may transmit, on the uplink shared channel in a first slot according to the determined configuration, the peak suppression information frequency multiplexed with the data signal in a first slot.

The transmitter 1040 may transmit data signals generated by other components of the device 1005. In some examples, the transmitter 1040 may be collocated with a receiver 1010 in a transceiver component. For example, the transmitter 1040 may be an example of aspects of the transceiver 1220 described with reference to FIG. 12. The transmitter 1040 may utilize a single antenna or a set of antennas. In some implementations, the transmitter 1040 may include or may be coupled with a PA.

Figure 11:
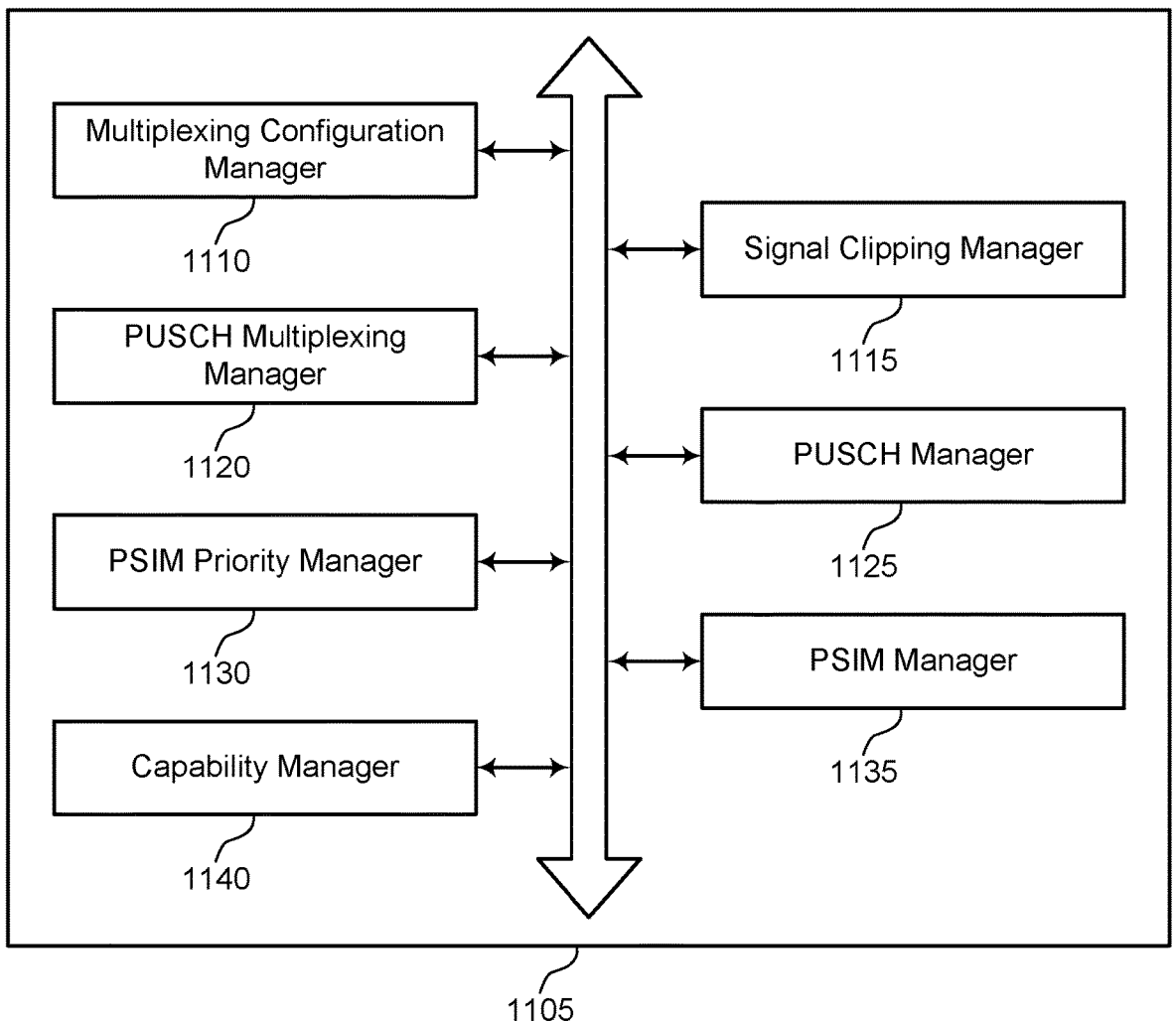
FIG. 11 shows a block diagram of a communications manager that supports PSIM multiplexing on a PUSCH in accordance with one or more aspects of the present disclosure.

FIG. 11 shows a block diagram of a communications manager 1105 that supports PSIM multiplexing on a PUSCH in accordance with one or more aspects of the present disclosure. The communications manager 1105 may be an example of aspects of a communications manager 915, a communications manager 1015, or a communications manager 1210 described herein. The communications manager 1105 may include a multiplexing configuration manager 1110, a signal clipping manager 1115, a PUSCH multiplexing manager 1120, a PUSCH manager 1125, a PSIM priority manager 1130, a PSIM manager 1135, and a capability manager 1140. Each of these components may communicate, directly or indirectly, with one another (for example, via one or more buses).

The multiplexing configuration manager 1110 may determine a configuration for frequency multiplexing a peak suppression information on an uplink shared channel. In some examples, the multiplexing configuration manager 1110 may receive configuration information including an indication of a pattern of resource elements for the peak suppression information, the configuration determined based on the received configuration information. In some examples, the multiplexing configuration manager 1110 may determine that the peak suppression information of a first symbol period is associated with a different transport block than other peak suppression information of other symbol periods. In some examples, the multiplexing configuration manager 1110 may determine that the peak suppression information of a first symbol period is associated with a same transport block than other peak suppression information of other symbol periods.

In some examples, the multiplexing configuration manager 1110 may determine that a same modulation and coding scheme is used for the peak suppression information and the data signal. In some examples, the multiplexing configuration manager 1110 may determine that a first modulation and coding scheme is used for the peak suppression information and a second modulation and coding scheme is used for the data signal, the first modulation and coding scheme different than the second modulation and coding scheme. In some examples, the multiplexing configuration manager 1110 may determine a first channel coding scheme for the peak suppression information different than a second channel coding scheme for the data signal. In some examples, the multiplexing configuration manager 1110 may receive configuration information for frequency multiplexing the peak suppression information on the uplink shared channel in response to the transmitted indication of the peak reconstruction capability of the UE, the configuration determined based on the received configuration information.

In some examples, the multiplexing configuration manager 1110 may determine, based on the configuration, a location of the peak suppression information corresponding to a last symbol period of the uplink shared channel. In some examples, the multiplexing configuration manager 1110 may determine, based on the configuration, a modulation and coding scheme for a last symbol period of the uplink shared channel, in which all resource elements of the last symbol period of the uplink shared channel include data information based on the determined modulation and coding scheme for the last symbol period. In some implementations, the configuration for frequency multiplexing the peak suppression information on the uplink shared channel indicates a pattern of resource elements for the peak suppression information on the uplink shared channel.

In some implementations, the pattern of resource elements for the peak suppression information uniformly positions the resource elements across frequency on the uplink shared channel. In some implementations, the first channel coding scheme corresponds to a greater redundancy relative to the second channel coding scheme or a same redundancy relative to the second channel coding scheme. In some implementations, the peak suppression information of a symbol period is repeated across all layers of a multiple-input multiple-output layer configuration. In some implementations, the peak suppression information of a symbol period is repeated across a subset of one or more layers of all layers of a multiple-input multiple-output layer configuration. In some implementations, the location is in an uplink control channel. In some implementations, the location includes a first symbol period of a second slot associated with the uplink shared channel, the second slot subsequent to the first slot. In some implementations, the location includes the last symbol period of the uplink shared channel. In some implementations, the peak suppression information includes one or more of amplitude information associated with one or more peaks of the data signal, position information associated with one or more peaks of the data signal, and phase information associated with one or more peaks of the data signal.

The signal clipping manager 1115 may deconstruct an uplink data message into a data signal and the peak suppression information.

The PUSCH multiplexing manager 1120 may frequency multiplex the data signal with the peak suppression information based on the determined configuration. In some examples, the PUSCH multiplexing manager 1120 may frequency multiplex the data signal and the peak suppression information with one or more of a channel state information or an acknowledgement feedback message. In some examples, the PUSCH multiplexing manager 1120 may frequency multiplex, based on the configuration, the peak suppression information associated with a first symbol period of the uplink shared channel with the data signal associated with a second symbol period of the uplink shared channel, the first symbol period being after the second symbol period. In some examples, the PUSCH multiplexing manager 1120 may frequency multiplex, based on the configuration, the data signal associated with a first symbol period of the uplink shared channel with the peak suppression information associated with a second symbol period of the uplink shared channel, the first symbol period after the second symbol period.

The PUSCH manager 1125 may transmit, on the uplink shared channel in a first slot according to the determined configuration, the peak suppression information frequency multiplexed with the data signal in a first slot.

The PSIM priority manager 1130 may receive an indication of a priority associated with the peak suppression information, in which the configuration is based on the priority.

The PSIM manager 1135 may determine a subset of amplitude peaks of the data signal to be included in the peak suppression information based on the pattern of resource elements. In some examples, the PSIM manager 1135 may determine the peak suppression information corresponds to a subset of peaks associated with the transmitted data signal based on the indicated pattern of resource elements. In some implementations, the subset of peaks include amplitude peaks of the data signal above a threshold amplitude.

The capability manager 1140 may transmit an indication of peak reconstruction capability of the UE.

Figure 12:
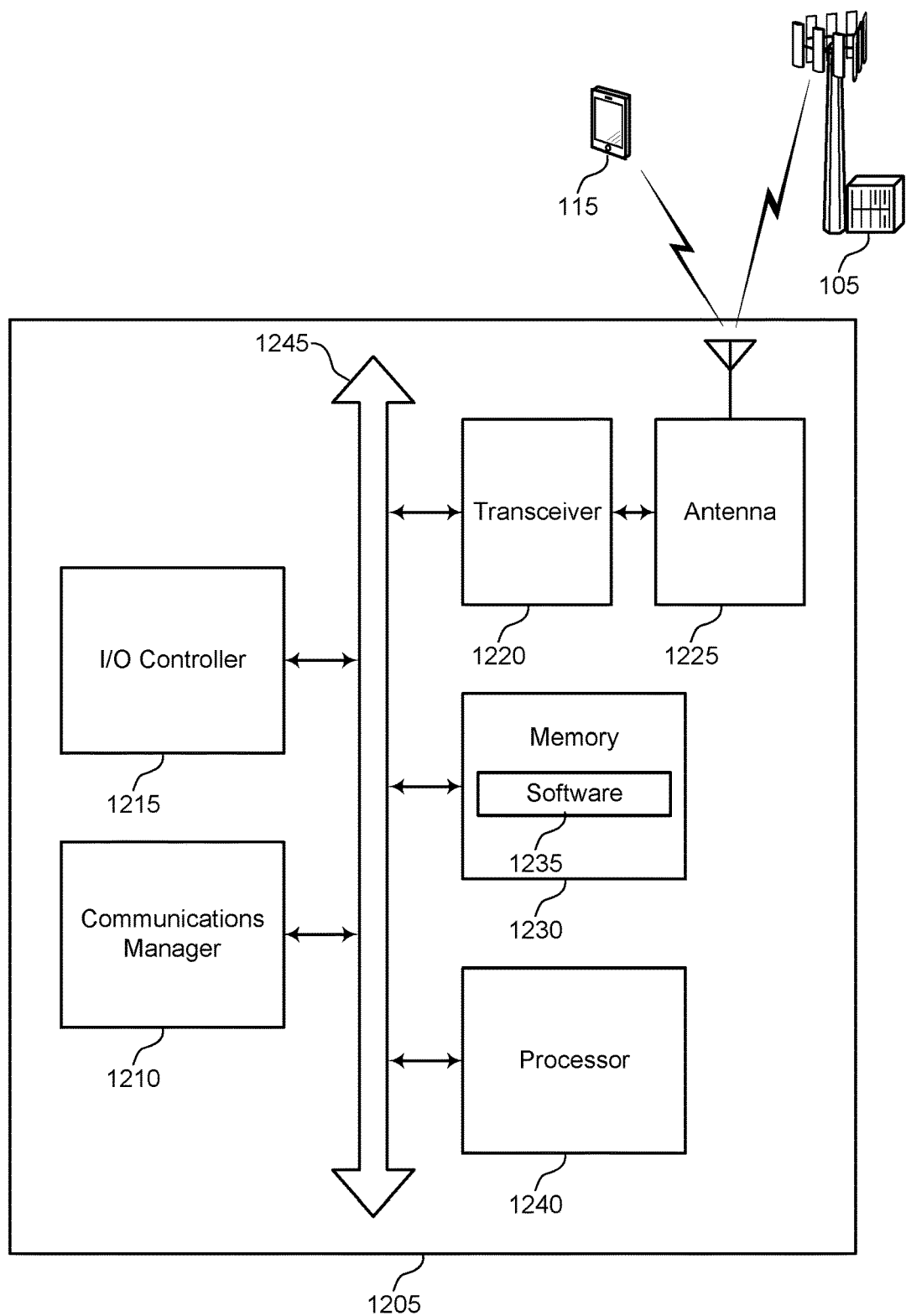
FIG. 12 shows a diagram of a system including a device that supports PSIM multiplexing on a PUSCH in accordance with one or more aspects of the present disclosure.

FIG. 12 shows a diagram of a system including a device 1205 that supports PSIM multiplexing on a PUSCH in accordance with one or more aspects of the present disclosure. The device 1205 may be an example of or include the components of device 905, device 1005, or a UE 115 as described with reference to FIG. 1. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (for example, bus 1245).

The communications manager 1210 may determine a configuration for frequency multiplexing a peak suppression information on an uplink shared channel, deconstruct an uplink data message into a data signal and the peak suppression information, frequency multiplex the data signal with the peak suppression information based on the determined configuration, and transmit, on the uplink shared channel in a first slot according to the determined configuration, the peak suppression information frequency multiplexed with the data signal in a first slot.

The I/O controller 1215 may manage input and output data signals for the device 1205. The I/O controller 1215 may also manage peripherals not integrated into the device 1205. In some implementations, the I/O controller 1215 may represent a physical connection or port to an external peripheral. In some implementations, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some implementations, the I/O controller 1215 may be implemented as part of a processor. In some implementations, a user may interact with the device 1205 via the I/O controller 1215 or via hardware components controlled by the I/O controller 1215.

The transceiver 1220 may communicate bi-directionally, via one or more antennas, wired, or wireless links as described. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some implementations, the transceiver 1220 may include or may be coupled with a PA.

In some implementations, the wireless device may include a single antenna 1225. However, In some implementations the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code or software 1235 including instructions that, when executed, cause the processor to perform various functions described herein. In some implementations, the memory 1230 may contain, among other things, a basic I/O system (BIOS) which may control basic hardware or software operation such as the interaction with peripheral components or devices.

The processor 1240 may include an intelligent hardware device, (for example, a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some implementations, the processor 1240 may be configured to operate a memory array using a memory controller. In other cases, a memory controller may be integrated into the processor 1240. The processor 1240 may be configured to execute computer-readable instructions stored in a memory (for example, the memory 1230) to cause the device 1205 to perform various functions (for example, functions or tasks supporting PSIM multiplexing on a PUSCH).

The software 1235 may include instructions to implement aspects of the present disclosure, including instructions to support wireless communications. The software 1235 may be stored in a non-transitory computer-readable medium such as system memory or other type of memory. In some implementations, the software 1235 may not be directly executable by the processor 1240 but may cause a computer (for example, when compiled and executed) to perform functions described herein.

Figure 13:
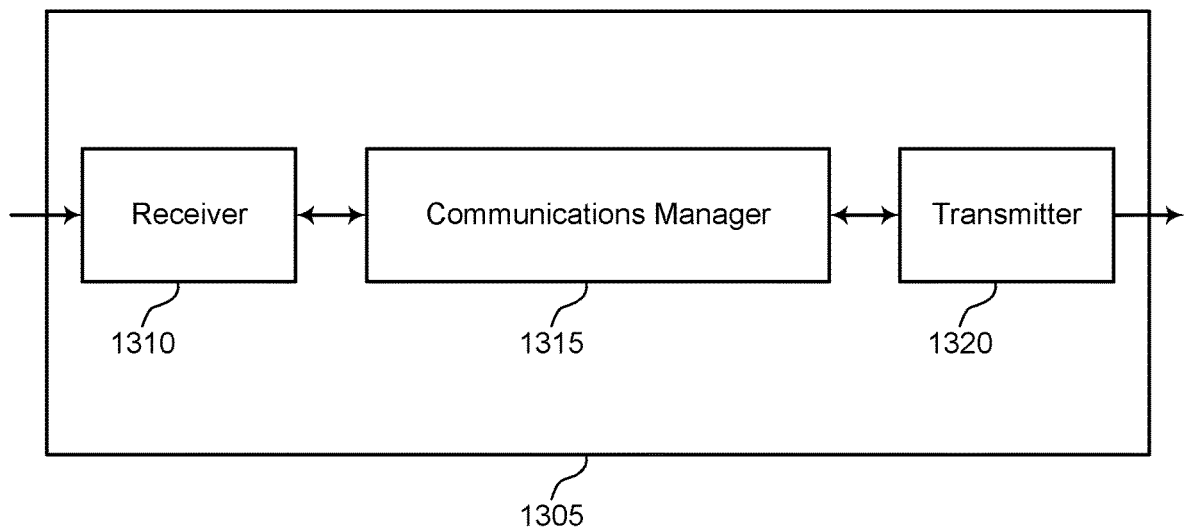
FIGS. 13 and 14 show block diagrams of devices that support PSIM multiplexing on a PUSCH in accordance with one or more aspects of the present disclosure.

FIG. 13 shows a block diagram of a device 1305 that supports PSIM multiplexing on a PUSCH in accordance with one or more aspects of the present disclosure. The device 1305 may be an example of aspects of a base station 105 as described with reference to FIG. 1. The device 1305 may include a receiver 1310, a communications manager 1315, and a transmitter 1320. The device 1305 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to PSIM multiplexing on A PUSCH, among other examples). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may determine a configuration for frequency multiplexing peak suppression information on an uplink shared channel, receive, on the uplink shared channel based on the determined configuration, the peak suppression information frequency multiplexed with a data signal in a first slot, reconstruct an uplink data message based on the received data signal and the received peak suppression information, and decode the reconstructed uplink data message.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver component. For example, the transmitter 1320 may be an example of aspects of the transceiver 1620 described with reference to FIG. 16. The transmitter 1320 may utilize a single antenna or a set of antennas. In some implementations, the transmitter 1320 may include or may be coupled with a PA.

Figure 14:
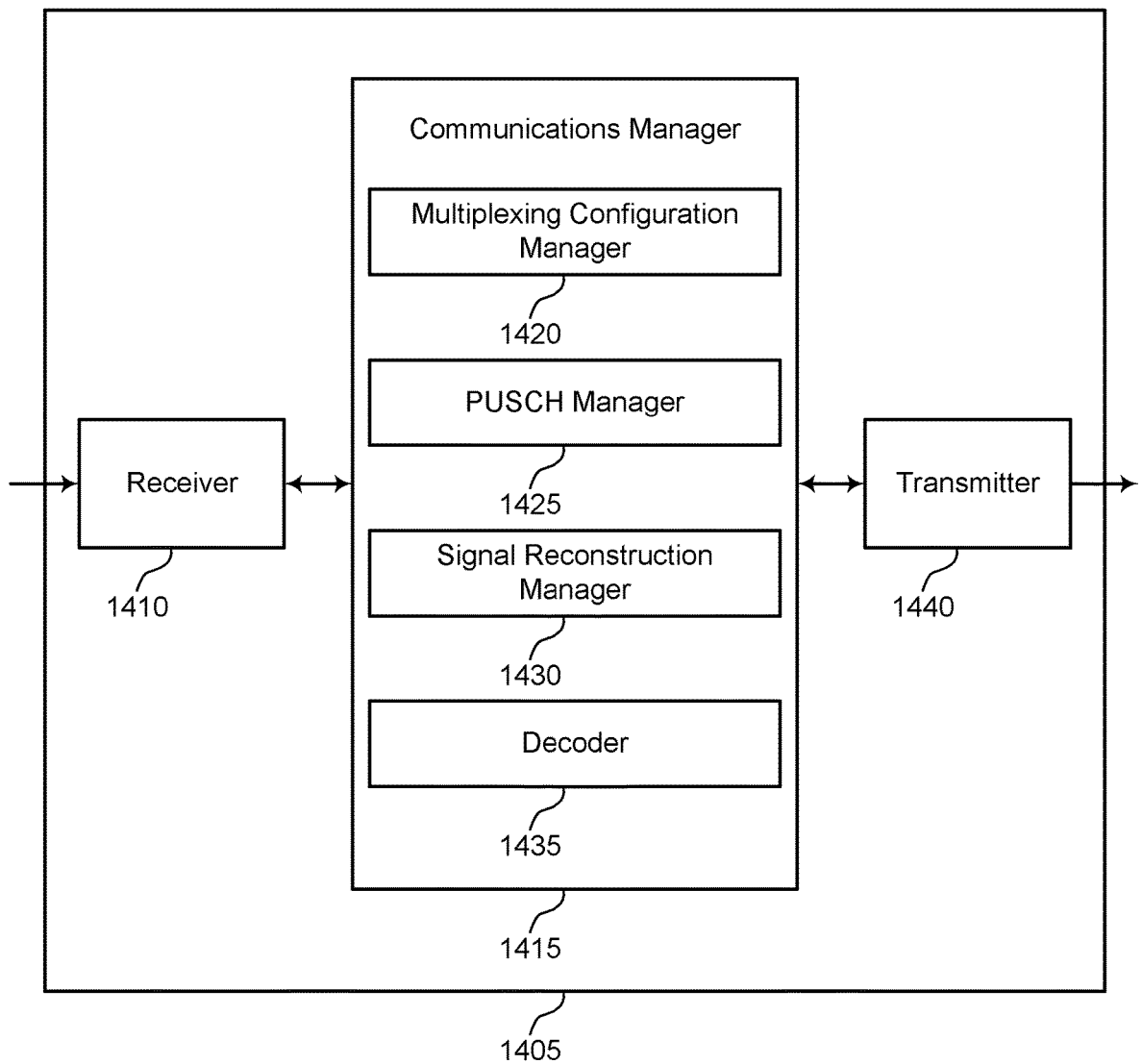

FIG. 14 shows a block diagram of a device 1405 that supports PSIM multiplexing on a PUSCH in accordance with one or more aspects of the present disclosure. The device 1405 may be an example of aspects of a device 1305, or a base station 105 as described with reference to FIG. 1. The device 1405 may include a receiver 1410, a communications manager 1415, and a transmitter 1440. The communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to PSIM multiplexing on A PUSCH, among other examples). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may include a multiplexing configuration manager 1420, a PUSCH manager 1425, a signal reconstruction manager 1430, and a decoder 1435.

The multiplexing configuration manager 1420 may determine a configuration for frequency multiplexing peak suppression information on an uplink shared channel. The PUSCH manager 1425 may receive, on the uplink shared channel based on the determined configuration, the peak suppression information frequency multiplexed with a data signal in a first slot. The signal reconstruction manager 1430 may reconstruct an uplink data message based on the received data signal and the received peak suppression information. The decoder 1435 may decode the reconstructed uplink data message.

The transmitter 1440 may transmit signals generated by other components of the device 1405. In some examples, the transmitter 1440 may be collocated with a receiver 1410 in a transceiver component. For example, the transmitter 1440 may be an example of aspects of the transceiver 1620 described with reference to FIG. 16. The transmitter 1440 may utilize a single antenna or a set of antennas. In some implementations, the transmitter 1440 may include or may be coupled with a PA.

Figure 15:
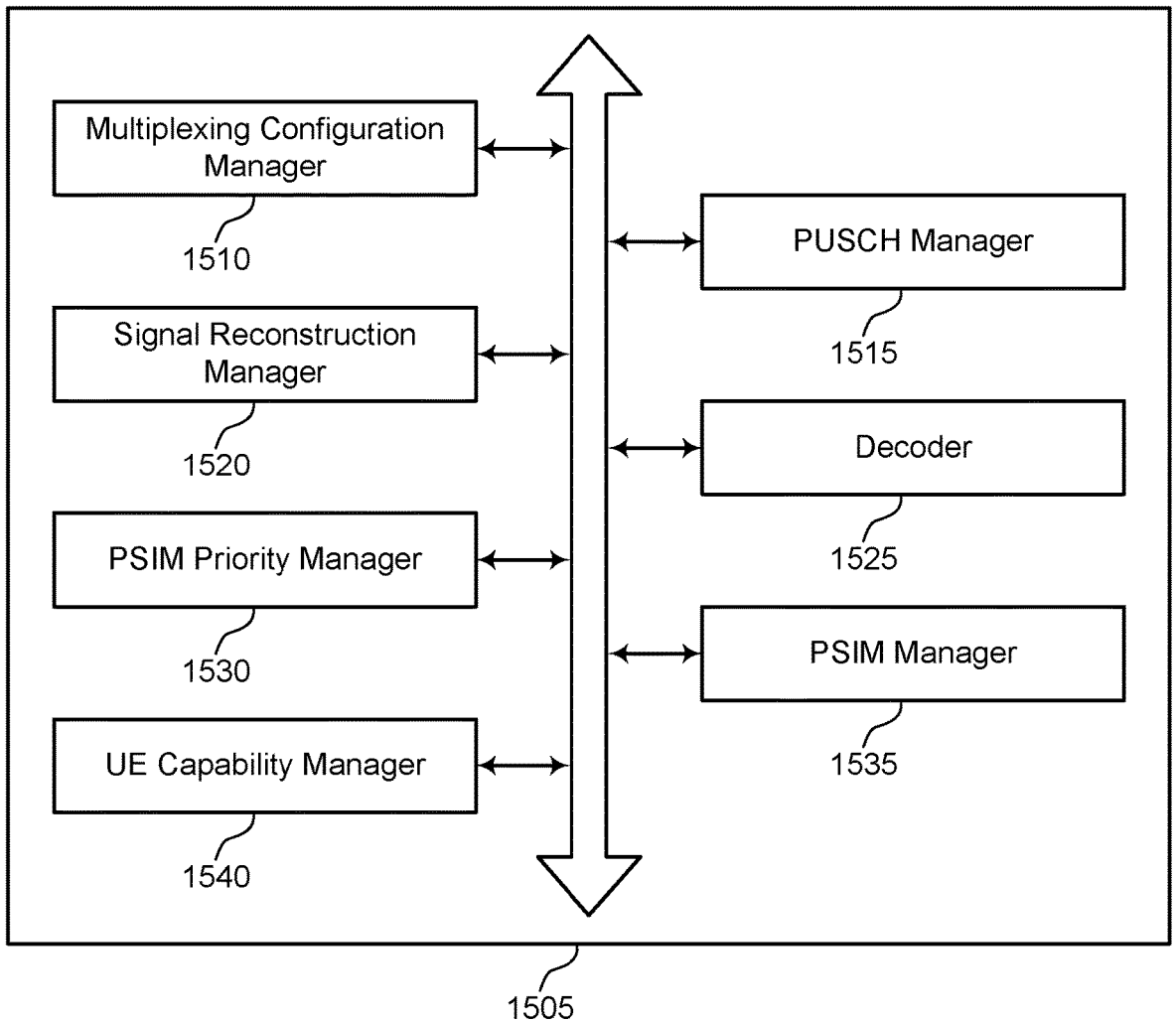
FIG. 15 shows a block diagram of a communications manager that supports PSIM multiplexing on a PUSCH in accordance with one or more aspects of the present disclosure.

FIG. 15 shows a block diagram of a communications manager 1505 that supports PSIM multiplexing on a PUSCH in accordance with one or more aspects of the present disclosure. The communications manager 1505 may be an example of aspects of a communications manager 1315, a communications manager 1415, or a communications manager 1610 described herein. The communications manager 1505 may include a multiplexing configuration manager 1510, a PUSCH manager 1515, a signal reconstruction manager 1520, a decoder 1525, a PSIM priority manager 1530, a PSIM manager 1535, and a UE capability manager 1540. Each of these components may communicate, directly or indirectly, with one another (for example, via one or more buses).

The multiplexing configuration manager 1510 may determine a configuration for frequency multiplexing peak suppression information on an uplink shared channel. In some examples, the multiplexing configuration manager 1510 may transmit configuration information including an indication of a pattern of resource elements for the peak suppression information, the configuration determined based on the transmitted configuration information. In some examples, the multiplexing configuration manager 1510 may determine that the peak suppression information of a first symbol period is associated with a different transport block than other peak suppression information of other symbol periods. In some examples, the multiplexing configuration manager 1510 may determine that peak suppression information of a first symbol period is associated with a same transport block as other peak suppression information of at least one other symbol period.

In some examples, the multiplexing configuration manager 1510 may determine that a same modulation and coding scheme is used for the peak suppression information and the data signal. In some examples, the multiplexing configuration manager 1510 may determine that a first modulation and coding scheme is used for the peak suppression information and a second modulation and coding scheme is used for the data signal, the first modulation and coding scheme different than the second modulation and coding scheme. In some examples, the multiplexing configuration manager 1510 may determine a first channel coding scheme for the peak suppression information different than a second channel coding scheme for the data signal.

In some examples, the multiplexing configuration manager 1510 may transmit the configuration for frequency multiplexing the peak suppression information on the uplink shared channel in response to the received indication of the peak reconstruction capability of the UE. In some examples, the multiplexing configuration manager 1510 may determine, based on the configuration, a location of the peak suppression information corresponding to a last symbol period of the uplink shared channel. In some examples, the multiplexing configuration manager 1510 may determine, based on the configuration, a modulation and coding scheme for a last symbol period of the uplink shared channel, in which all resource elements of the last symbol period of the uplink shared channel include data information based on the determined modulation and coding scheme for the last symbol period.

In some implementations, the configuration for frequency multiplexing the peak suppression information on the uplink shared channel indicates a pattern of resource elements for the peak suppression information on the uplink shared channel. In some implementations, the indicated pattern of resource elements for the peak suppression information uniformly positions the resource elements across frequency on the uplink shared channel. In some implementations, the first channel coding scheme corresponds to a greater redundancy relative to the second channel coding scheme or a same redundancy relative to the second channel coding scheme. In some implementations, the peak suppression information of a symbol period is repeated across all layers of a multiple-input multiple-output layer configuration.

In some implementations, the peak suppression information of a symbol period is repeated across a subset of one or more layers of all layers of a multiple-input multiple-output layer configuration. In some implementations, the location is in an uplink control channel. In some implementations, the location includes a first symbol period of a second slot associated with the uplink shared channel, the second slot subsequent to the first slot. In some implementations, the location includes the last symbol period of the uplink shared channel. In some implementations, the peak suppression information includes one or more of amplitude information associated with one or more peaks of the data signal, position information associated with one or more peaks of the data signal, and phase information associated with one or more peaks of the data signal.

The PUSCH manager 1515 may receive, on the uplink shared channel based on the determined configuration, the peak suppression information frequency multiplexed with a data signal in a first slot. In some examples, the PUSCH manager 1515 may receive the data signal and the peak suppression information multiplexed in frequency with one or more of a channel state information or an acknowledgement feedback message.

The signal reconstruction manager 1520 may reconstruct an uplink data message based on the received data signal and the received peak suppression information. In some examples, the signal reconstruction manager 1520 may reconstruct the uplink data message based on the data signal received in a first symbol period of the uplink shared channel and the peak suppression information received in a second symbol period of the uplink shared channel, the second symbol period after the first symbol period. In some examples, the signal reconstruction manager 1520 may reconstruct the uplink data message based on the peak suppression information received in a first symbol period of the uplink shared channel and the data signal received in a second symbol period of the uplink shared channel, the second symbol period after the first symbol period. In some examples, the signal reconstruction manager 1520 may reconstruct the uplink data message based on the data signal received in a same symbol period of the uplink shared channel as the peak suppression information.

The decoder 1525 may decode the reconstructed uplink data message.

The PSIM priority manager 1530 may transmit an indication of a priority associated with the peak suppression information, in which the configuration is based on the priority.

The PSIM manager 1535 may determine a subset of amplitude peaks of the data signal included in the peak suppression information based on the indicated pattern of resource elements. In some examples, the PSIM manager 1535 may determine that the peak suppression information corresponds to a subset of amplitude peaks of the received data signal based on the indicated pattern of resource elements. In some implementations, the subset of peaks include amplitude peaks of the data signal above a threshold amplitude.

The UE capability manager 1540 may receive an indication of peak reconstruction capability of the UE.

Figure 16:
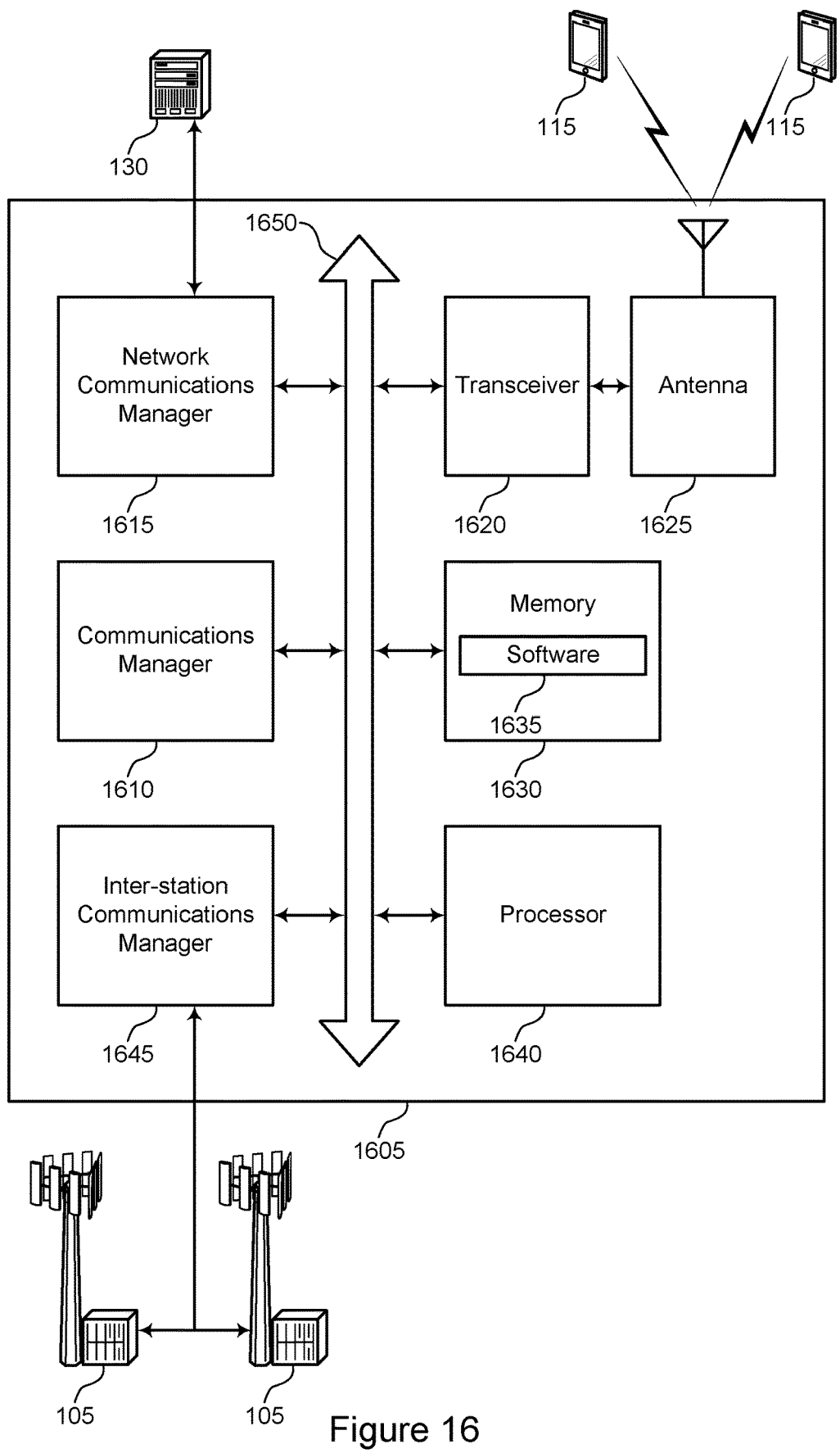
FIG. 16 shows a diagram of a system including a device that supports PSIM multiplexing on a PUSCH in accordance with one or more aspects of the present disclosure.

FIG. 16 shows a diagram of a system including a device 1605 that supports PSIM multiplexing on a PUSCH in accordance with one or more aspects of the present disclosure. The device 1605 may be an example of or include the components of device 1305, device 1405, or a base station 105 as described with reference to FIG. 1. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (for example, bus 1650).

The communications manager 1610 may determine a configuration for frequency multiplexing peak suppression information on an uplink shared channel, receive, on the uplink shared channel based on the determined configuration, the peak suppression information frequency multiplexed with a data signal in a first slot, reconstruct an uplink data message based on the received data signal and the received peak suppression information, and decode the reconstructed uplink data message.

The network communications manager 1615 may manage communications with the core network (for example, via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some implementations, the transceiver 1620 may include or may be coupled with a PA.

In some implementations, the wireless device may include a single antenna 1625. However, in some implementations, the device may have more than one antenna 1625, which may be capable of concurrently transmitting or receiving multiple wireless transmissions.

The memory 1630 may include RAM, ROM, or a combination thereof. The memory 1630 may store computer-readable code or software 1635 including instructions that, if executed by a processor (for example, the processor 1640) cause the device to perform various functions described herein. In some implementations, the memory 1630 may contain, among other things, a BIOS which may control basic hardware or software operation such as the interaction with peripheral components or devices.

The processor 1640 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1640 may be configured to operate a memory array using a memory controller. In some implementations, a memory controller may be integrated into processor 1640. The processor 1640 may be configured to execute computer-readable instructions stored in a memory (for example, the memory 1630) to cause the device 1605 to perform various functions (for example, functions or tasks supporting PSIM multiplexing on A PUSCH).

The inter-station communications manager 1645 may manage communications with other base station 105, and may include a controller or scheduler for controlling communications with the UEs 115 in cooperation with other base stations 105. For example, the inter-station communications manager 1645 may coordinate scheduling for transmissions to the UEs 115 for various interference mitigation techniques such as beamforming or joint transmission. In some examples, the inter-station communications manager 1645 may provide an X2 interface within an LTE/LTE-A wireless communication network technology to provide communication between the base stations 105.

The software 1635 may include instructions to implement aspects of the present disclosure, including instructions to support wireless communications. The software 1635 may be stored in a non-transitory computer-readable medium such as system memory or other type of memory. In some implementations, the software 1635 may not be directly executable by the processor 1640 but may cause a computer (for example, if compiled and executed) to perform functions described herein.

Figure 17:
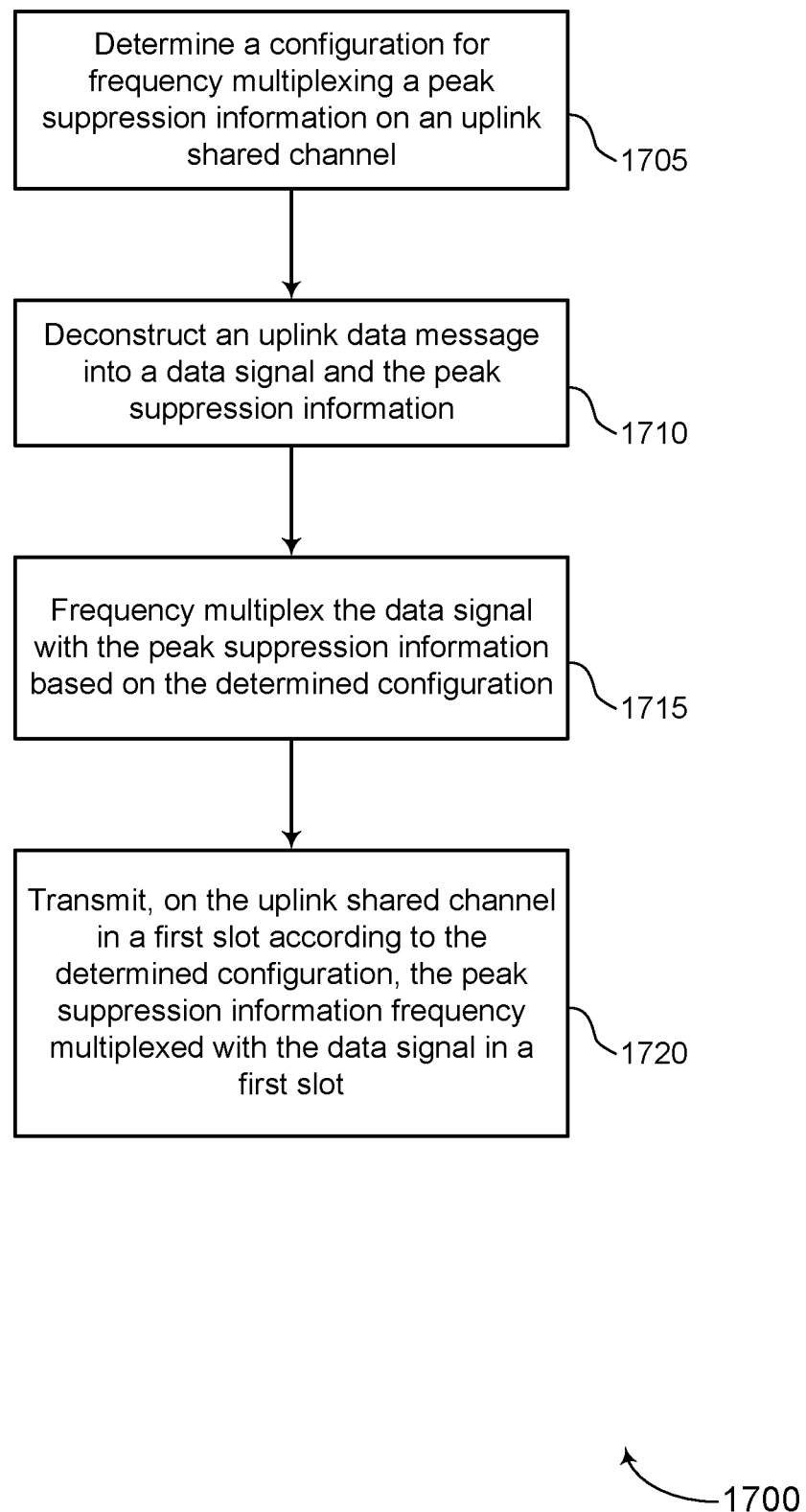
FIGS. 17 through 20 show flowcharts illustrating methods that support PSIM multiplexing on a PUSCH in accordance with one or more aspects of the present disclosure.

FIG. 17 shows a flowchart illustrating a method 1700 that supports PSIM multiplexing on a PUSCH in accordance with one or more aspects of the present disclosure. The operations of method 1700 may be implemented by a UE 115 or its components as described with reference to FIG. 1. For example, the operations of method 1700 may be performed by a communications manager as described with reference to FIGS. 9-12. In some examples, a UE may execute a set of instructions to control the functional elements of the UE to perform the functions described. Additionally or alternatively, a UE may perform aspects of the functions described using special-purpose hardware.

At 1705, the UE may determine a configuration for frequency multiplexing a peak suppression information on an uplink shared channel. The operations of 1705 may be performed according to the methods described herein. In some examples, aspects of the operations of 1705 may be performed by a multiplexing configuration manager as described with reference to FIGS. 9-12.

At 1710, the UE may deconstruct an uplink data message into a data signal and the peak suppression information. The operations of 1710 may be performed according to the methods described herein. In some examples, aspects of the operations of 1710 may be performed by a signal clipping manager as described with reference to FIGS. 9-12.

At 1715, the UE may frequency multiplex the data signal with the peak suppression information based on the determined configuration. The operations of 1715 may be performed according to the methods described herein. In some examples, aspects of the operations of 1715 may be performed by a PUSCH multiplexing manager as described with reference to FIGS. 9-12.

At 1720, the UE may transmit, on the uplink shared channel in a first slot according to the determined configuration, the peak suppression information frequency multiplexed with the data signal in a first slot. The operations of 1720 may be performed according to the methods described herein. In some examples, aspects of the operations of 1720 may be performed by a PUSCH manager as described with reference to FIGS. 9-12.

Figure 18:
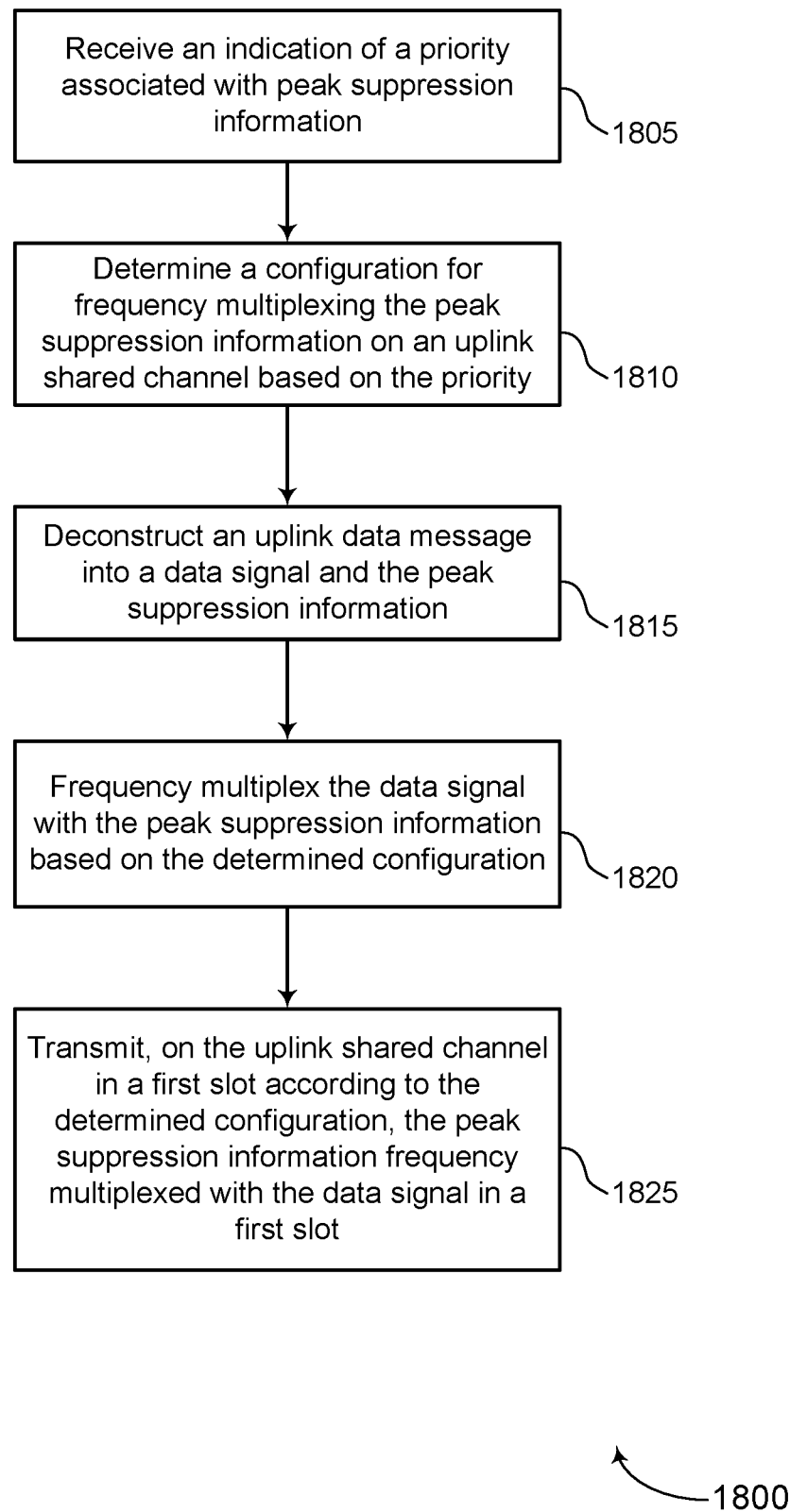

FIG. 18 shows a flowchart illustrating a method 1800 that supports PSIM multiplexing on a PUSCH in accordance with one or more aspects of the present disclosure. The operations of method 1800 may be implemented by a UE 115 or its components as described with reference to FIG. 1. For example, the operations of method 1800 may be performed by a communications manager as described with reference to FIGS. 9-12. In some examples, a UE may execute a set of instructions to control the functional elements of the UE to perform the functions described. Additionally or alternatively, a UE may perform aspects of the functions described using special-purpose hardware.

At 1805, the UE may receive an indication of a priority associated with a peak suppression information. The operations of 1805 may be performed according to the methods described herein. In some examples, aspects of the operations of 1805 may be performed by a PSIM priority manager as described with reference to FIGS. 9-12.

At 1810, the UE may determine a configuration for frequency multiplexing the peak suppression information on an uplink shared channel (for example, in which the configuration may be determined based on the indication of the priority associated with the peak suppression information). For example, the configuration for frequency multiplexing the peak suppression information on the uplink shared channel may be based on the priority of the peak suppression information relative to the priority of other uplink traffic such as CSI, HARQ-ACK, among other examples. For instance, the configuration for frequency multiplexing the peak suppression information may include more REs if the priority associated with the peak suppression information is higher than other uplink traffic to be multiplexed on the uplink shared channel. Alternatively, the configuration for frequency multiplexing the peak suppression information may include less REs if the priority associated with the peak suppression information is lower than other uplink traffic to be multiplexed on the uplink shared channel. The operations of 1810 may be performed according to the methods described herein. In some examples, aspects of the operations of 1810 may be performed by a multiplexing configuration manager as described with reference to FIGS. 9-12.

At 1815, the UE may deconstruct an uplink data message into a data signal and the peak suppression information. The operations of 1815 may be performed according to the methods described herein. In some examples, aspects of the operations of 1815 may be performed by a signal clipping manager as described with reference to FIGS. 9-12.

At 1820, the UE may frequency multiplex the data signal with the peak suppression information based on the determined configuration. The operations of 1820 may be performed according to the methods described herein. In some examples, aspects of the operations of 1820 may be performed by a PUSCH multiplexing manager as described with reference to FIGS. 9-12.

At 1825, the UE may transmit, on the uplink shared channel in a first slot according to the determined configuration, the peak suppression information frequency multiplexed with the data signal in a first slot. The operations of 1825 may be performed according to the methods described herein. In some examples, aspects of the operations of 1825 may be performed by a PUSCH manager as described with reference to FIGS. 9-12.

Figure 19:
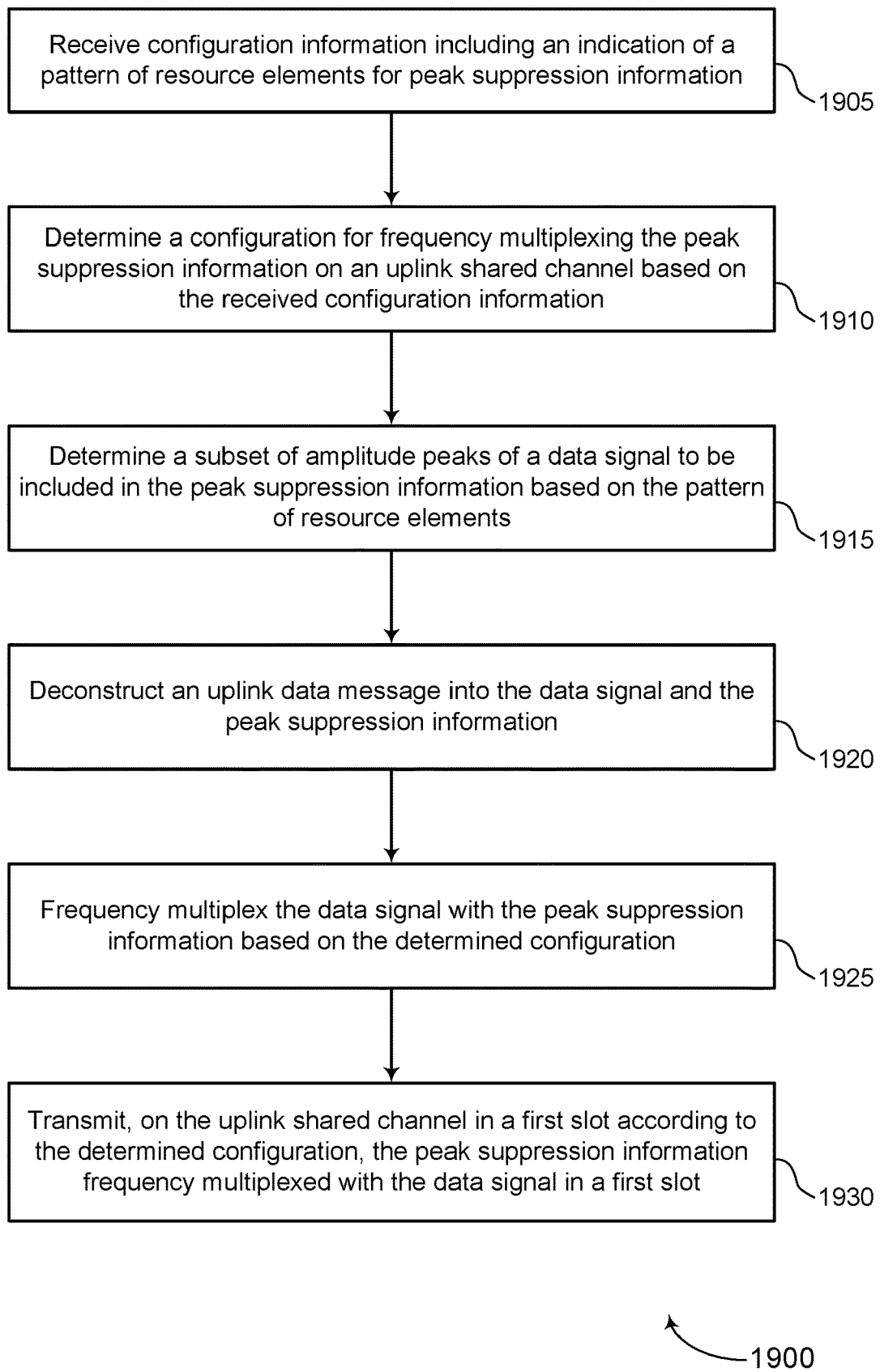

FIG. 19 shows a flowchart illustrating a method 1900 that supports PSIM multiplexing on a PUSCH in accordance with one or more aspects of the present disclosure. The operations of method 1900 may be implemented by a UE 115 or its components as described with reference to FIG. 1. For example, the operations of method 1900 may be performed by a communications manager as described with reference to FIGS. 9-12. In some examples, a UE may execute a set of instructions to control the functional elements of the UE to perform the functions described. Additionally or alternatively, a UE may perform aspects of the functions described using special-purpose hardware.

At 1905, the UE may receive configuration information including an indication of a pattern of resource elements for peak suppression information. The operations of 1905 may be performed according to the methods described herein. In some examples, aspects of the operations of 1905 may be performed by a multiplexing configuration manager as described with reference to FIGS. 9-12.

At 1910, the UE may determine a configuration for frequency multiplexing the peak suppression information on an uplink shared channel based on the received configuration information. The operations of 1910 may be performed according to the methods described herein. In some examples, aspects of the operations of 1910 may be performed by a multiplexing configuration manager as described with reference to FIGS. 9-12.

At 1915, the UE may determine a subset of amplitude peaks of a data signal to be included in the peak suppression information based on the pattern of resource elements. The operations of 1915 may be performed according to the methods described herein. In some examples, aspects of the operations of 1915 may be performed by a PSIM manager as described with reference to FIGS. 9-12.

At 1920, the UE may deconstruct an uplink data message into the data signal and the peak suppression information. In some implementations, the UE may deconstruct the uplink data message into the data signal and the peak suppression information based on the determined subset of amplitude peaks of the data signal to be included in the peak suppression information. The operations of 1920 may be performed according to the methods described herein. In some examples, aspects of the operations of 1920 may be performed by a signal clipping manager as described with reference to FIGS. 9-12.

At 1925, the UE may frequency multiplex the data signal with the peak suppression information based on the determined configuration. The operations of 1925 may be performed according to the methods described herein. In some examples, aspects of the operations of 1925 may be performed by a PUSCH multiplexing manager as described with reference to FIGS. 9-12.

At 1930, the UE may transmit, on the uplink shared channel in a first slot according to the determined configuration, the peak suppression information frequency multiplexed with the data signal in a first slot. The operations of 1930 may be performed according to the methods described herein. In some examples, aspects of the operations of 1930 may be performed by a PUSCH manager as described with reference to FIGS. 9-12.

Figure 20:
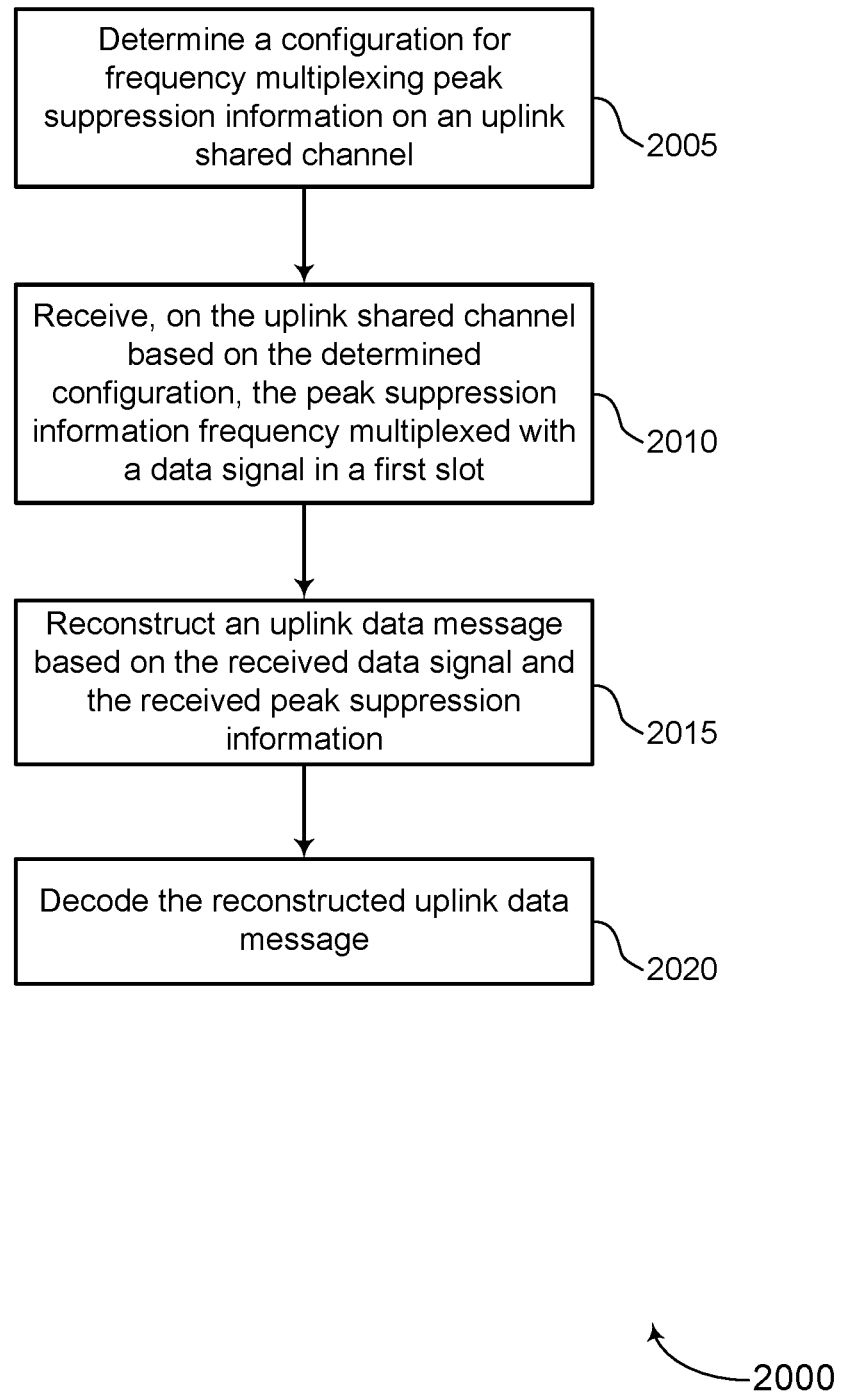

FIG. 20 shows a flowchart illustrating a method 2000 that supports PSIM multiplexing on a PUSCH in accordance with one or more aspects of the present disclosure. The operations of method 2000 may be implemented by a base station 105 or its components as described with reference to FIG. 1. For example, the operations of method 2000 may be performed by a communications manager as described with reference to FIGS. 13-16. In some examples, a base station may execute a set of instructions to control the functional elements of the base station to perform the functions described. Additionally or alternatively, a base station may perform aspects of the functions described using special-purpose hardware.

At 2005, the base station may determine a configuration for frequency multiplexing peak suppression information on an uplink shared channel. The operations of 2005 may be performed according to the methods described herein. In some examples, aspects of the operations of 2005 may be performed by a multiplexing configuration manager as described with reference to FIGS. 13-16.

At 2010, the base station may receive, on the uplink shared channel based on the determined configuration, the peak suppression information frequency multiplexed with a data signal in a first slot. The operations of 2010 may be performed according to the methods described herein. In some examples, aspects of the operations of 2010 may be performed by a PUSCH manager as described with reference to FIGS. 13-16.

At 2015, the base station may reconstruct an uplink data message based on the received data signal and the received peak suppression information. The operations of 2015 may be performed according to the methods described herein. In some examples, aspects of the operations of 2015 may be performed by a signal reconstruction manager as described with reference to FIGS. 13-16.

At 2020, the base station may decode the reconstructed uplink data message. The operations of 2020 may be performed according to the methods described herein. In some examples, aspects of the operations of 2020 may be performed by a decoder as described with reference to FIGS. 13-16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining a configuration for frequency multiplexing peak suppression information on a physical uplink shared channel, wherein the peak suppression information comprises information associated with peak suppression of a data signal;
    deconstructing an uplink data message into the data signal and the peak suppression information;
    frequency multiplexing the data signal with the peak suppression information based at least in part on the determined configuration; and
    transmitting, on the physical uplink shared channel in a first slot according to the determined configuration, the peak suppression information frequency multiplexed with the data signal in the first slot.

2. The method of claim 1, further comprising receiving an indication of a priority associated with the peak suppression information, wherein the configuration is based at least in part on the priority.

3. The method of claim 1, further comprising receiving configuration information comprising an indication of a pattern of resource elements for the peak suppression information, the configuration determined based at least in part on the received configuration information.

4. The method of claim 3, wherein deconstructing the uplink data message comprises determining a subset of amplitude peaks of the data signal to be included in the peak suppression information based at least in part on the pattern of resource elements.

5. The method of claim 1, wherein the frequency multiplexing further comprises frequency multiplexing the data signal and the peak suppression information with one or more of a channel state information or an acknowledgement feedback message.

6. The method of claim 1, wherein the configuration for frequency multiplexing the peak suppression information on the physical uplink shared channel indicates a pattern of resource elements for the peak suppression information on the physical uplink shared channel.

7. The method of claim 6, wherein the pattern of resource elements for the peak suppression information uniformly positions resource elements across frequency on the physical uplink shared channel.

8. The method of claim 6, wherein the peak suppression information corresponds to a subset of peaks associated with the data signal based at least in part on the indicated pattern of resource elements.

9. The method of claim 8, wherein the subset of peaks comprise amplitude peaks of the data signal above a threshold amplitude.

10. The method of claim 1, wherein frequency multiplexing the data signal with the peak suppression information comprises frequency multiplexing, based at least in part on the configuration, the peak suppression information associated with a first symbol period of the physical uplink shared channel with the data signal associated with a second symbol period of the physical uplink shared channel, the first symbol period being after the second symbol period.

11. The method of claim 1, wherein frequency multiplexing the data signal with the peak suppression information comprises frequency multiplexing, based at least in part on the configuration, the data signal associated with a first symbol period of the physical uplink shared channel with the peak suppression information associated with a second symbol period of the physical uplink shared channel, the first symbol period after the second symbol period.

12. The method of claim 1, wherein determining the configuration comprises determining that the peak suppression information of a first symbol period is associated with a different transport block than other peak suppression information of other symbol periods.

13. The method of claim 1, wherein determining the configuration comprises determining that the peak suppression information of a first symbol period is associated with a same transport block than other peak suppression information of other symbol periods.

14. The method of claim 1, wherein determining the configuration comprises determining that a same modulation and coding scheme is used for the peak suppression information and the data signal.

15. The method of claim 1, wherein determining the configuration comprises determining that a first modulation and coding scheme is used for the peak suppression information and a second modulation and coding scheme is used for the data signal, the first modulation and coding scheme different than the second modulation and coding scheme.

16. The method of claim 1, wherein determining the configuration comprises determining a first channel coding scheme for the peak suppression information different than a second channel coding scheme for the data signal.

17. The method of claim 16, wherein the first channel coding scheme corresponds to a greater redundancy relative to the second channel coding scheme or a same redundancy relative to the second channel coding scheme.

18. The method of claim 1, wherein the peak suppression information of a symbol period is repeated across all layers of a multiple-input multiple-output layer configuration.

19. The method of claim 1, wherein the peak suppression information of a symbol period is repeated across a subset of one or more layers of all layers of a multiple-input multiple-output layer configuration.

20. The method of claim 1, further comprising:
transmitting an indication of peak reconstruction capability of the UE; and
receiving configuration information for frequency multiplexing the peak suppression information on the physical uplink shared channel in response to the transmitted indication of the peak reconstruction capability of the UE, the configuration determined based at least in part on the received configuration information.

21. The method of claim 1, further comprising determining, based at least in part on the configuration, a location of the peak suppression information corresponding to a last symbol period of the physical uplink shared channel.

22. The method of claim 21, wherein the location is in an uplink control channel.

23. The method of claim 21, wherein the location comprises a first symbol period of a second slot associated with the physical uplink shared channel, the second slot subsequent to the first slot.

24. The method of claim 21, wherein the location comprises the last symbol period of the physical uplink shared channel.

25. The method of claim 1, further comprising determining, based at least in part on the configuration, a modulation and coding scheme for a last symbol period of the physical uplink shared channel, wherein all resource elements of the last symbol period of the physical uplink shared channel comprise data information based at least in part on the determined modulation and coding scheme for the last symbol period.

26. The method of claim 1, wherein the peak suppression information comprises one or more of amplitude information associated with one or more peaks of the data signal, position information associated with one or more peaks of the data signal, and phase information associated with one or more peaks of the data signal.

27. A method for wireless communication at a network access node, comprising:
determining a configuration for frequency multiplexing peak suppression information on a physical uplink shared channel, wherein the peak suppression information comprises information associated with peak suppression of a data signal;
receiving, on the physical uplink shared channel based at least in part on the determined configuration, the peak suppression information frequency multiplexed with the data signal in a first slot;
reconstructing an uplink data message based at least in part on the received data signal and the received peak suppression information; and
decoding the reconstructed uplink data message.

28. The method of claim 27, further comprising transmitting an indication of a priority associated with the peak suppression information, wherein the configuration is based at least in part on the priority.

29. The method of claim 27, further comprising transmitting configuration information comprising an indication of a pattern of resource elements for the peak suppression information, the configuration determined based at least in part on the transmitted configuration information.

30. The method of claim 29 wherein reconstructing the uplink data message comprises determining a subset of amplitude peaks of the data signal included in the peak suppression information based at least in part on the indicated pattern of resource elements.

31. The method of claim 27, further comprising receiving the data signal and the peak suppression information multiplexed in frequency with one or more of a channel state information or an acknowledgement feedback message.

32. An apparatus for wireless communication at a user equipment (UE), comprising:
a processor,
memory coupled with the processor; and
instructions stored in the memory and executable by the processor to cause the apparatus to:
determining a configuration for frequency multiplexing peak suppression information on a physical uplink shared channel, wherein the peak suppression information comprises information associated with peak suppression of a data signal;
deconstruct an uplink data message into the data signal and the peak suppression information;
frequency multiplex the data signal with the peak suppression information based at least in part on the determined configuration; and
transmit, on the physical uplink shared channel in a first slot according to the determined configuration, the peak suppression information frequency multiplexed with the data signal in the first slot.

33. The apparatus of claim 32, wherein the instructions are further executable by the processor to cause the apparatus to receive an indication of a priority associated with the peak suppression information, wherein the configuration is based at least in part on the priority.

34. The apparatus of claim 32, wherein the instructions are further executable by the processor to cause the apparatus to receive configuration information comprising an indication of a pattern of resource elements for the peak suppression information, the configuration determined based at least in part on the received configuration information.

35. The apparatus of claim 34, wherein the instructions to deconstruct the uplink data message are executable by the processor to cause the apparatus to determine a subset of amplitude peaks of the data signal to be included in the peak suppression information based at least in part on the pattern of resource elements.

36. The apparatus of claim 32, wherein the frequency multiplexing further comprises frequency multiplexing the data signal and the peak suppression information with one or more of a channel state information or an acknowledgement feedback message.

37. The apparatus of claim 32, wherein the configuration for frequency multiplexing the peak suppression information on the physical uplink shared channel indicates a pattern of resource elements for the peak suppression information on the physical uplink shared channel.

38. The apparatus of claim 37, wherein the pattern of resource elements for the peak suppression information uniformly positions resource elements across frequency on the physical uplink shared channel.

39. The apparatus of claim 37, wherein the peak suppression information corresponds to a subset of peaks associated with the data signal based at least in part on the indicated pattern of resource elements.

40. The apparatus of claim 39, wherein the subset of peaks comprise amplitude peaks of the data signal above a threshold amplitude.

41. The apparatus of claim 32, wherein the instructions to frequency multiplex the data signal with the peak suppression information are executable by the processor to cause the apparatus to frequency multiplex, based at least in part on the configuration, the peak suppression information associated with a first symbol period of the physical uplink shared channel with the data signal associated with a second symbol period of the physical uplink shared channel, the first symbol period being after the second symbol period.

42. The apparatus of claim 32, wherein the instructions to frequency multiplex the data signal with the peak suppression information are executable by the processor to cause the apparatus to frequency multiplex, based at least in part on the configuration, the data signal associated with a first symbol period of the physical uplink shared channel with the peak suppression information associated with a second symbol period of the physical uplink shared channel, the first symbol period after the second symbol period.

43. The apparatus of claim 32, wherein the instructions to determine the configuration are executable by the processor to cause the apparatus to determine that the peak suppression information of a first symbol period is associated with a different transport block than other peak suppression information of other symbol periods.

44. The apparatus of claim 32, wherein the instructions to determine the configuration are executable by the processor to cause the apparatus to determine that the peak suppression information of a first symbol period is associated with a same transport block than other peak suppression information of other symbol periods.

45. The apparatus of claim 32, wherein the instructions to determine the configuration are executable by the processor to cause the apparatus to determine that a same modulation and coding scheme is used for the peak suppression information and the data signal.

46. The apparatus of claim 32, wherein the instructions to determine the configuration are executable by the processor to cause the apparatus to determine that a first modulation and coding scheme is used for the peak suppression information and a second modulation and coding scheme is used for the data signal, the first modulation and coding scheme different than the second modulation and coding scheme.

47. The apparatus of claim 32, wherein the instructions to determine the configuration are executable by the processor to cause the apparatus to determine a first channel coding scheme for the peak suppression information different than a second channel coding scheme for the data signal.

48. The apparatus of claim 47, wherein the first channel coding scheme corresponds to a greater redundancy relative to the second channel coding scheme or a same redundancy relative to the second channel coding scheme.

49. The apparatus of claim 32, wherein the peak suppression information of a symbol period is repeated across all layers of a multiple-input multiple-output layer configuration.

50. The apparatus of claim 32, wherein the peak suppression information of a symbol period is repeated across a subset of one or more layers of all layers of a multiple-input multiple-output layer configuration.

51. The apparatus of claim 32, wherein the instructions are further executable by the processor to cause the apparatus to:
transmit an indication of peak reconstruction capability of the UE; and
receive configuration information for frequency multiplexing the peak suppression information on the physical uplink shared channel in response to the transmitted indication of the peak reconstruction capability of the UE, the configuration determined based at least in part on the received configuration information.

52. The apparatus of claim 32, wherein the instructions are further executable by the processor to cause the apparatus to determine, based at least in part on the configuration, a location of the peak suppression information corresponding to a last symbol period of the physical uplink shared channel.

53. The apparatus of claim 52, wherein the location is in an uplink control channel.

54. The apparatus of claim 52, wherein the location comprises a first symbol period of a second slot associated with the physical uplink shared channel, the second slot subsequent to the first slot.

55. The apparatus of claim 52, wherein the location comprises the last symbol period of the physical uplink shared channel.

56. The apparatus of claim 32, wherein the instructions are further executable by the processor to cause the apparatus to determine, based at least in part on the configuration, a modulation and coding scheme for a last symbol period of the physical uplink shared channel, wherein all resource elements of the last symbol period of the physical uplink shared channel comprise data information based at least in part on the determined modulation and coding scheme for the last symbol period.

57. The apparatus of claim 32, wherein the peak suppression information comprises one or more of amplitude information associated with one or more peaks of the data signal, position information associated with one or more peaks of the data signal, and phase information associated with one or more peaks of the data signal.

58. An apparatus for wireless communication at a network access node, comprising:
a processor,
memory coupled with the processor; and
instructions stored in the memory and executable by the processor to cause the apparatus to:
determining a configuration for frequency multiplexing peak suppression information on a physical uplink shared channel, wherein the peak suppression information comprises information associated with peak suppression of a data signal;
receive, on the physical uplink shared channel based at least in part on the determined configuration, the peak suppression information frequency multiplexed with the data signal in a first slot;
reconstruct an uplink data message based at least in part on the received data signal and the received peak suppression information; and
decode the reconstructed uplink data message.

59. The apparatus of claim 58, wherein the instructions are further executable by the processor to cause the apparatus to transmit an indication of a priority associated with the peak suppression information, wherein the configuration is based at least in part on the priority.

60. The apparatus of claim 58, wherein the instructions are further executable by the processor to cause the apparatus to transmit configuration information comprising an indication of a pattern of resource elements for the peak suppression information, the configuration determined based at least in part on the transmitted configuration information.

61. The apparatus of claim 60, wherein the instructions to reconstruct the uplink data message are executable by the processor to cause the apparatus to determine a subset of amplitude peaks of the data signal included in the peak suppression information based at least in part on the indicated pattern of resource elements.

62. The apparatus of claim 58, wherein the instructions are further executable by the processor to cause the apparatus to receive the data signal and the peak suppression information multiplexed in frequency with one or more of a channel state information or an acknowledgement feedback message.

* * * * *